United States Patent
Tibbetts et al.

(10) Patent No.: US 10,731,508 B2
(45) Date of Patent: Aug. 4, 2020

(54) METHOD FOR CLEANING COMPONENTS OF A TURBINE ENGINE

(71) Applicant: GENERAL ELECTRIC COMPANY, Schenectady, NY (US)

(72) Inventors: Nicole Jessica Tibbetts, Delanson, NY (US); Bernard Patrick Bewlay, Niskayuna, NY (US); Ambarish Jayant Kulkarni, Glenville, NY (US); Byron Andrew Pritchard, Jr., Loveland, OH (US); Keith Anthony Lauria, Wells, NY (US); Michael Edward Eriksen, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 151 days.

(21) Appl. No.: 15/451,836

(22) Filed: Mar. 7, 2017

(65) Prior Publication Data
US 2018/0258787 A1    Sep. 13, 2018

(51) Int. Cl.
*F01D 25/00* (2006.01)
*B08B 3/08* (2006.01)
(Continued)

(52) U.S. Cl.
CPC ............ *F01D 25/002* (2013.01); *B08B 3/003* (2013.01); *B08B 3/02* (2013.01); *B64F 5/30* (2017.01);
(Continued)

(58) Field of Classification Search
None
See application file for complete search history.

(56) References Cited

U.S. PATENT DOCUMENTS

| 5,339,845 A * | 8/1994 | Huddas ................. B08B 9/00 134/169 A |
| 5,970,574 A | 10/1999 | Thrash, Jr. |

(Continued)

FOREIGN PATENT DOCUMENTS

| JP | 2007063998 A | 3/2007 |
| WO | 2015051146 A1 | 4/2015 |

OTHER PUBLICATIONS

"Engine Washing", Aviation Today, pp. 1-3, Sep. 1, 2006.
(Continued)

*Primary Examiner* — Katelyn B Whatley
(74) *Attorney, Agent, or Firm* — Joseph F. Harding; The Small Patent Law Group LLC

(57) ABSTRACT

The present disclosure provides methods and systems of generating flows of detergent through a turbine engine to effectuate cleaning of components thereof. The methods include introducing a foamed, acid-including detergent with a pH range of between 2 and 7 into a gas flowpath of the turbine engine. The methods also include creating a pressure differential in an aft portion of the gas flowpath with respect to a forward portion of the gas flowpath to generate a flow of the detergent therethrough. The methods further include creating a pressure differential in a forward portion of the gas flowpath with respect to an aft portion of the gas flowpath to generate a counterflow of the detergent therethrough. The flow and counterflow of the detergent through the gas flowpath interact with components of the turbine engine having foreign material thereon to at least partially remove the foreign material therefrom.

15 Claims, 9 Drawing Sheets

(51) Int. Cl.
*B08B 3/00* (2006.01)
*C11D 3/20* (2006.01)
*B08B 3/02* (2006.01)
*C11D 11/00* (2006.01)
*B64F 5/30* (2017.01)

(52) U.S. Cl.
CPC ........ *C11D 3/2086* (2013.01); *C11D 11/0041* (2013.01); *Y02T 50/6765* (2018.05)

(56) References Cited

U.S. PATENT DOCUMENTS

| | | | |
|---|---|---|---|
| D422,055 S | 3/2000 | Charles et al. | |
| 6,118,000 A | 9/2000 | Frenier | |
| 6,311,704 B1 | 11/2001 | Foster | |
| 6,454,871 B1 | 9/2002 | Labib et al. | |
| 6,478,033 B1 * | 11/2002 | Foster | C11D 3/0073 134/22.1 |
| 6,491,048 B1 | 12/2002 | Foster | |
| 6,503,334 B2 | 1/2003 | Ruiz et al. | |
| 6,521,028 B1 | 2/2003 | Frenier | |
| 6,916,429 B2 | 7/2005 | Kool et al. | |
| 7,198,052 B2 | 4/2007 | Watt | |
| 8,057,607 B2 | 11/2011 | Gardner et al. | |
| 8,246,753 B2 | 8/2012 | Tadayon | |
| 8,308,869 B2 | 11/2012 | Gardner et al. | |
| 8,444,773 B2 | 5/2013 | Tadayon | |
| 8,524,011 B2 | 9/2013 | Gardner et al. | |
| 8,628,627 B1 | 1/2014 | Sales et al. | |
| 8,728,246 B2 | 5/2014 | Varrin, Jr. et al. | |
| 8,763,855 B1 | 7/2014 | Harvey et al. | |
| 8,871,090 B2 | 10/2014 | Livshits et al. | |
| 8,919,391 B1 | 12/2014 | Harvey et al. | |
| 9,074,830 B2 | 7/2015 | Moll et al. | |
| 9,316,115 B2 | 4/2016 | Sales | |
| 2002/0103093 A1 | 8/2002 | Lagraff et al. | |
| 2003/0015554 A1 | 1/2003 | Gatzke | |
| 2006/0137724 A1 | 6/2006 | Powers et al. | |
| 2006/0219269 A1 | 10/2006 | Rice et al. | |
| 2007/0062562 A1 | 3/2007 | Leaphart | |
| 2008/0040872 A1 | 2/2008 | Hjerpe | |
| 2008/0149141 A1 | 6/2008 | Sales | |
| 2009/0084411 A1 | 4/2009 | Woodcock et al. | |
| 2010/0000572 A1 | 1/2010 | Giljohann et al. | |
| 2010/0095984 A1 | 4/2010 | Tadayon | |
| 2010/0243000 A1 | 9/2010 | Boettcher et al. | |
| 2011/0088720 A1 | 4/2011 | Varanasi et al. | |
| 2014/0034091 A1 | 2/2014 | Dorshimer et al. | |
| 2014/0083466 A1 | 3/2014 | Sales, Jr. et al. | |
| 2014/0144473 A1 | 5/2014 | Martin | |
| 2015/0159122 A1 | 6/2015 | Tibbetts et al. | |
| 2015/0159505 A1 | 6/2015 | Scipio et al. | |
| 2015/0198059 A1 | 7/2015 | Scipio et al. | |
| 2016/0024438 A1 | 1/2016 | Tibbetts et al. | |
| 2016/0067750 A1 | 3/2016 | Griffiths et al. | |
| 2016/0236799 A1 | 8/2016 | Bewlay et al. | |
| 2017/0130649 A1 | 5/2017 | Bewlay et al. | |
| 2017/0165721 A1 | 6/2017 | Tibbetts et al. | |
| 2017/0167290 A1 | 6/2017 | Kulkarni et al. | |
| 2017/0175569 A1 * | 6/2017 | Rawson | F01D 25/002 |
| 2017/0209904 A1 * | 7/2017 | Eriksen | B08B 9/00 |
| 2017/0254221 A1 * | 9/2017 | Roberts | F01D 25/285 |

OTHER PUBLICATIONS

Eriksen et al., "Turbine Engine Cleaning Systems and Methods", U.S. Appl. No. 15/005,096, filed Jan. 25, 2016.
Kulkarni et al., "Methods and System for Cleaning Gas Turbine Engine", U.S. Appl. No. 15/443,048, filed Feb. 27, 2017.
"On-wing Washing system Using Injected Water or Detergent which Penetrates Deep .into the Engine, Cleaning Performance Stealing Contaminants", Aero Jet Wash LLC, pp. 1-2, Aug. 18, 2017.
Brittain, "Cleaning Gas Turbine Compressors: Some Service Experience with a Wet-wash System", Aircraft Engineering and Aerospace Technology, vol. No. 55, Issue No. 1, pp. 15-17, Jan. 1983.
Petasch et al., "Low-Pressure Plasma Cleaning: A Process for Precision Cleaning Applications", Surface and Coatings Technology, vol. No. 97, Issue No. 1-3, pp. 176-181, Dec. 1997.
GE Related Case Form.

* cited by examiner

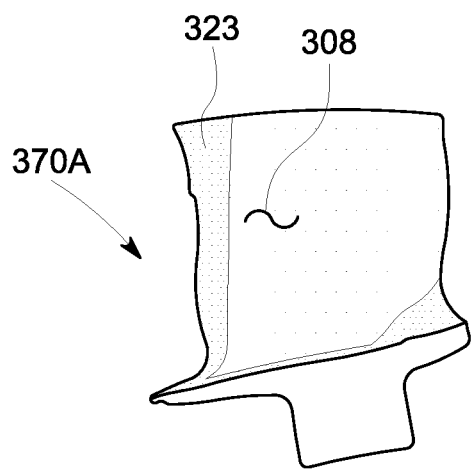
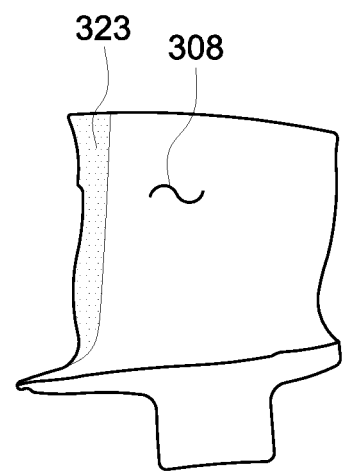
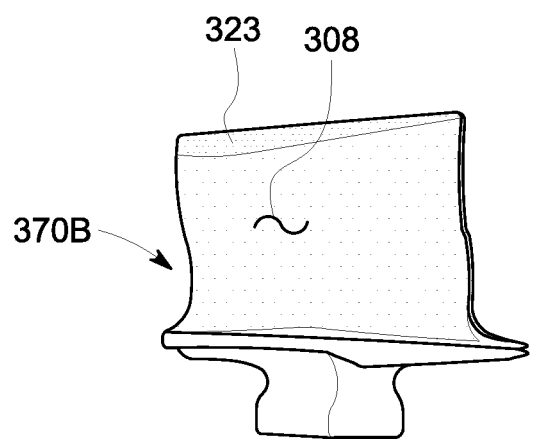
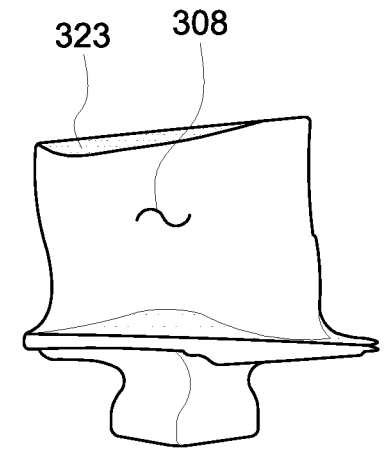
FIG. 9A                    FIG. 9B

METHOD FOR CLEANING COMPONENTS OF A TURBINE ENGINE

The field of the present disclosure relates generally to methods of cleaning turbine engines and, more specifically, to methods and systems of controlling at least one flow of detergent through a turbine engine in order to effectuate cleaning of components thereof.

Turbine engines used to propel aircraft through certain routes often experience significant fouling due to foreign material, such as environmental contaminant or particulate, intake during flight, idling, take-off, landing, etc. Turbine engines used in other applications may similarly experience such foreign material intake. Some foreign material that is deposited or built up on turbine components includes or is formed of environmental contaminants, such as for example combinations of airborne pollutants (e.g., sulfates, nitrates, etc.), natural evaporite deposits (e.g., halite, carbonates, etc.) and dust (e.g., aluminosilicate clays).

Foreign material fouling or buildup may degrade the performance of a turbine engine. For example, one known mechanism for fouling is the accumulation of foreign material, as such environmental contaminants, on both components of internal cooling circuits and components forming the hot gas flowpath through the engine. The hot gas flowpath through a turbine engine is the geometrical assembly established by a range of complex components in a turbine that interact with combusting and burning fuel and the expansion and exhaust of such gases. In this way, the hot gas flowpath components of a turbine engine may be positioned where fuel is combusted and burned within the turbine to convert the stored energy thereof, and where such gas is expanded and exhausted within the turbine to transform the energy into motion (e.g., rotation) of components of the turbine. Such combustion may take place in a combustion section or combustor of a turbine, and such expansion and exhaust may take place in a turbine section and an exhaust section, respectively, of the turbine. Typical hot gas flowpath components in turbine engines (e.g., aircraft turbine engines and power-generating gas turbines) thereby include stationary vanes or nozzles and rotating blades or buckets of a high pressure turbine (HPT), shrouds surrounding the rotating blades, and combustor liners, domes, deflectors/splashplates and flame-holding segments. The combustor section of a turbine typically includes the combustor liners, domes, and the deflectors/splashplates. Other components of a turbine not specifically listed herein may, however, partially form or interact with the hot gas flowpath through a turbine engine.

The accumulation of foreign material on the components of the internal cooling circuits may block the cooling passages thereof, such as film cooling holes, by forming layers of fouling material therein. The decreased cooling from at least partially blocked cooling circuits may contribute to an increase in temperature of the hot gas flowpath surfaces of the turbine that interact with the hot gas flowpath through the turbine. As with the cooling circuits, the contaminants may accumulate on the portions of the hot gas flowpath components that interact with the hot gas flowpath of the turbine.

Surfaces or portions of many hot gas flowpath components that interact with the hot gas flowpath include a ceramic thermal barrier coating (TBC). The thermal barrier coatings (TBCs), which are typically formed of a refractory material, over the component surfaces enhance the performance of the underlying metal (e.g., superalloy) or other material forming the component at high temperatures by reducing the temperature at the surface of the underlying material. Some flowpath components may include an environmental barrier coating (EBC), such as an oxide coating, which is resistance to high temperature water vapor environments to protect the components therefrom.

As the operating temperatures hot gas flowpath components increases, such as due to decreased cooling from the blocked cooling circuits and/or the accumulating contaminants acting as an insulator that decreases the designed heat transfer of the components, the components may fuse and/or bond of the foreign material contaminants, such as environmental contaminants. Often, accumulated foreign material contaminants include a mixture airborne pollutants (e.g., sulfates, nitrates, etc.), natural evaporite deposits (e.g., halite, carbonates, etc.) and dust (e.g., aluminosilicate clays. For example, the foreign material contaminants may include at least one of calcium, magnesium, aluminum and silicon (e.g., at least one of CaO, MgO, Al2O3 and SiO2), often referred to as CMAS. If component surfaces include a TBC coating, the foreign material contaminants may infiltrate the TBC coating, thereby decreasing the TBC durability. As a TBC fails catastrophically through spallation due to infiltration, it initially exposes underlying bond coats and can progress to expose the parent metal (or other material) through oxidization or other deterioration during subsequent use of the turbine. If such a turbine is a high pressure jet engine, such spallation and oxidation can quickly exceed allowable limits for serviceability and lead to unplanned engine removals, decreased time on wing, and increased scrap rate due to unrepairable parent metal distress.

Additionally, surfaces of hot gas flowpath components that interact with the hot gas flowpath (whether including a TBC or not) can also accumulate one or more layers of foreign material, such as environmental contaminants, thereon. For example, build-up of contaminants on the turbine nozzle and/or turbine blades of a small turbine engine, such as a turbine powering a helicopter, can at least partially block the hot gas flowpath. Blockage of the hot gas flowpath may reduce turbine flow, thereby resulting in higher turbine operating temperatures, reduced hot-section durability, reduced engine stall margin and, potentially, reduced engine power.

Water wash treatments, which are frequently used to clean turbine components, often are not successful in removing typical accumulated foreign material contaminants and its secondary reaction products. At least one known method of removing foreign material accumulated on turbine components includes impinging dry ice particles against the turbine components. However, dry ice is not specifically tailored to dissolve fouling deposits based on the elemental composition of the accumulated contaminants and its reaction products, and instead focuses on mechanical removal of the foreign material. Dry ice blasting techniques have thereby been shown to be only partially effective in removing foreign material, such as CMAS, and ineffective at removing infiltrated foreign material from TBC coated components. Another known method includes treating surfaces of the turbine engine with an acid solution including $H_xAF_6$. Such known acid solutions are generally only tailored to remove low-temperature reaction-based products of typical accumulated foreign material, and are not formulated such that they can be applied in situ (e.g., on-wing) to an assembled turbine engine. For example, many acid-based detergents do not meet the AMS1551a or engine manufacturer material compatibility requirements.

Turbine cleaning solutions that remove accumulated foreign material contaminants that can be applied at the component, sub-assembly or fully assembled turbine engine condition are therefore desirable. Further, turbine cleaning solutions that effectively remove accumulated foreign material contaminants (surface deposits or infiltrated deposits) from flowpath turbine components are also desirable.

BRIEF DESCRIPTION

In one aspect, the present disclosure provides a method of cleaning a turbine engine. The method includes introducing a foamed, acid-including detergent with a pH range of between 2 and 7 into a gas flowpath of the turbine engine. The method also includes creating a pressure differential in an aft portion of the gas flowpath of the turbine engine with respect to a forward portion of the gas flowpath to generate a flow of the detergent therethrough. The method further includes creating a pressure differential in a forward portion of the gas flowpath with respect to an aft portion of the gas flowpath to generate a counterflow of the detergent therethrough. The flow and counterflow of the detergent through the gas flowpath interact with components of the turbine engine having a layer of foreign material thereon to at least partially remove the foreign material from the components.

In some embodiments, the flow of the detergent and the counterflow of the detergent are formed sequentially. In some embodiments, the flow of the detergent through the gas flowpath extends in a direction that gases pass therethrough during operation of the turbine engine, and the counterflow of the detergent through the gas flowpath extends in a direction opposing a direction that gases pass therethrough during operation of the turbine engine. In some embodiments at least one of the components includes at least one cooling hole at least partially blocked by the foreign material, and the flow and counterflow of the detergent through the gas flowpath removes the foreign material from at least partially blocking the at least one cooling hole.

In some embodiments, the pressure differential is created in the forward portion of the gas flowpath via at least one port of a forward distribution plug that substantially seals the forward portion of the gas flowpath. In some such embodiments, the detergent is introduced into the forward portion of the gas flowpath via at least one port of the forward distribution plug. In some embodiments, the pressure differential is created in the aft portion of the gas flowpath via at least one port of an aft distribution plug that substantially seals the aft portion of the gas flowpath. In some such embodiments, the detergent is introduced into the aft portion of the gas flowpath via at least one port of the aft distribution plug.

In some embodiments, the method includes at least one of: creating a pressure differential in the aft portion of the gas flowpath of the turbine engine with respect to a forward portion of the gas flowpath comprises creating a vacuum in the aft portion of the gas flowpath with respect to a forward portion of the gas flowpath; and creating a pressure differential in the forward portion of the gas flowpath of the turbine engine with respect to an aft portion of the gas flowpath comprises creating a vacuum in the forward portion of the gas flowpath with respect to an aft portion of the gas flowpath. In some embodiments, the method includes at least one of: creating a pressure differential in the aft portion of the gas flowpath of the turbine engine with respect to a forward portion of the gas flowpath comprises creating a pressure in the aft portion of the gas flowpath that is greater than the pressure within a forward portion of the gas flowpath; and creating a pressure differential in the forward portion of the gas flowpath of the turbine engine with respect to an aft portion of the gas flowpath comprises creating a pressure in the aft portion of the gas flowpath that is greater than the pressure within an aft portion of the gas flowpath.

In some embodiments, the components include at least one of a combustor section component, a compressor section component and a turbine section component of the turbine engine. In solve embodiments, the foreign material includes at least one of calcium, magnesium, aluminum and silicon. In some such embodiments, at least one of components includes a thermal barrier coating (TBC), and the layer of foreign material overlies the TBC. In some embodiments, the detergent includes citric acid. In some embodiments, the detergent at least partially dissolves the foreign material. In some embodiments, detergent is introduced into the gas flowpath of the turbine engine at a temperature within the range of 20 degrees C. to about 95 degrees C. In some embodiments, the pressure differentials in the aft and forward portions of the gas flowpath of the turbine engine are varied over time to control the flow the detergent therethrough.

In another aspect, the present disclosure provides a turbine engine including components that have been cleaned by a turbine engine cleaning method and/or system of the present disclosure.

In another aspect, the present disclosure provides a system for cleaning a turbine engine. The system includes a supply of an acid-including detergent with a pH range of between 2 and 7. The system also includes a detergent supply mechanism configured to introduce the acid-including detergent as a foam into a gas flowpath of the turbine engine. The system further includes an aft pressure differential mechanism configured to create a pressure differential in an aft portion of the gas flowpath of the turbine engine with respect to a forward portion of the gas flowpath to generate a flow of the foamed detergent therethrough. The system also includes a forward pressure differential mechanism configured to create a pressure differential in a forward portion of the gas flowpath of the turbine engine with respect to an aft portion of the gas flowpath to generate a counterflow of the foamed detergent therethrough. The flow and counterflow of the detergent through the gas flowpath interact with components of the turbine engine having a layer of foreign material thereon to at least partially remove the foreign material from the components.

In some embodiments, the detergent includes citric acid. In some embodiments, the system further includes a forward distribution plug including at least one forward port that that substantially seals a forward portion of the gas flowpath of the turbine engine, and the forward pressure differential mechanism is configured to create a pressure differential in a forward portion of the gas via the at least one forward port of the forward distribution plug. In some embodiments, the system further includes an aft distribution plug including at least one aft port that that substantially seals an aft portion of the gas flowpath of the turbine engine, and the aft pressure differential mechanism is configured to create a pressure differential in an aft portion of the gas via the at least one aft port of the aft distribution plug.

These and other objects, features and advantages of this disclosure will become apparent from the following detailed description of the various aspects of the disclosure taken in conjunction with the accompanying drawings.

BRIEF DESCRIPTION OF THE DRAWINGS

FIG. 9A illustrates a pair of compressor blades of the compressor section of FIG. 8 with foreign material accumulated thereon, and FIG. 9B illustrates the pair of compressor blades of FIG. 9A subsequent to cleaning by the turbine engine cleaning system and method of the present disclosure.

DETAILED DESCRIPTION

Figure 1:
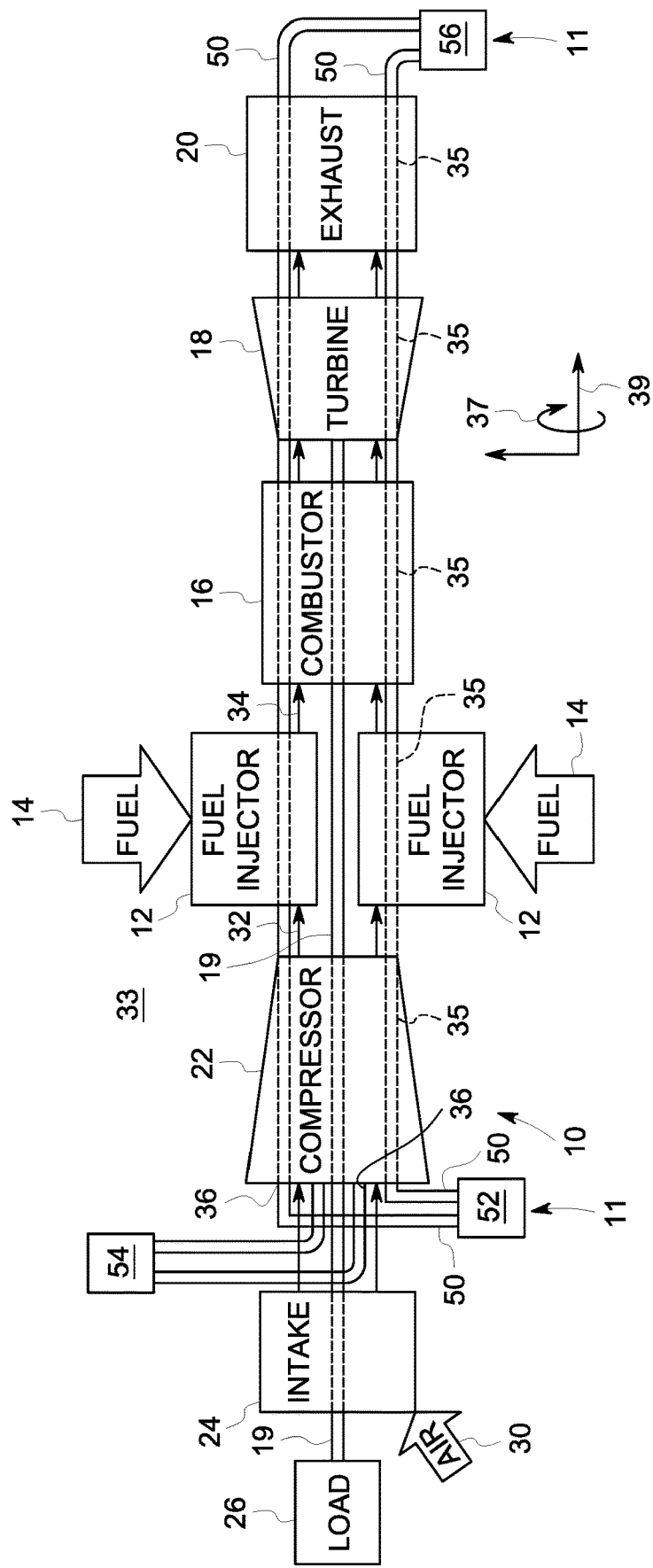
FIG. 1 is a schematic view of an embodiment of a turbine engine system and a cleaning method and system according to the present disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The present disclosure provides methods and systems for cleaning a flowpath of a gas turbine engine, such as a hot gas flowpath, using an acid-including detergent (e.g., a detergent including citric acid). As explained further below, the flowpath may be defined or formed by a multitude of components that cooperate to create one or more passageways of combusting, combusted, expanding and/or exhaust gases flowing through the turbine engine. A flowpath component is thereby a component that includes at least a portion that forms the flowpath(s) and interacts with the gases flowing through the flowpath during operation of the turbine engine.

The acid-including detergent based methods and systems of cleaning one or more flowpath of a gas turbine engine of the present disclosure may be utilized to remove accumulated environmental contaminants or dust, such as at least one component of CMAS for example, from the gas flowpath components. For example, the turbine cleaning methods and systems of the present disclosure may remove accumulated foreign material including at least one of calcium, magnesium, aluminum and silicon (or a form thereof) from flowpath components. As explained further below, flowpath components that may include such foreign martial may include, but are not limited to, combustor components (e.g., liners), stationary components (such as shrouds, nozzles, and vanes), and rotating components (such as blades, or buckets). At least some of the flowpath components may include a thermal barrier coating (TBC) over portions of the components that interact with relatively hot gases. Similarly, at least some of the flowpath components may include an environmental barrier coating (EBC) over the portions of the components that interact with the hot gases. Still further, at least some of the flowpath components may be void of a TBC and/or an EBC. The turbine cleaning methods and systems of the present disclosure may be utilized to clean accumulated foreign material, such as environmental contaminants, from flowpath components (e.g., hot gas flowpath components) with a TBC, components with an EBC, and components void of a TBC and/or an EBC (i.e., uncoated flowpath components).

The accumulation of foreign material on flowpath components of a turbine engine may create a surface roughness and/or other anomalies that degrade the aerodynamic performance of the components. Further, accumulated foreign material may at least partially plug cooling holes, such as film cooling holes, that interact with the flowpath. The accumulated foreign material may thereby at least partially block the cooling holes and reduce the effectiveness of the cooling holes. The acid-including detergent based turbine cleaning methods and systems of the present disclosure may remove accumulated foreign material from the cooling holes, and thereby at least partially restore of the cooling efficiency of the cooling holes.

For flowpath components that include a TBC coating, the acid-including detergent-based turbine cleaning methods and systems of the present disclosure may remove foreign material accumulated on the TBC, such as CMAS, to prevent spallation of the TBC. Accumulated foreign material, such as environmental contaminants (e.g., airborne pollutants (e.g., sulfates, nitrates, etc.), natural evaporite deposits (e.g., halite, carbonates, etc.) and dust (e.g., aluminosilicate clays)), may accumulate on flowpath components (e.g., hot gas flowpath components) and become heated during turbine operation. The foreign material may fuse and/or infiltrate into the porosity of the TBC. For example, one or more constituent or and/or specie of accumulated CMAS may infiltrate into the porosity of the TBC during turbine operation. The porosity of the TBC is critical as it may provide compliance to accommodate the thermal strain mismatch between the TBC and the underlying component material beneath the TBC (e.g., typically a metal). The acid-including detergent based turbine cleaning methods and systems of the present disclosure may remove the foreign material accumulation on gas flowpath components prior to, or after, fusion and infiltration into the TBC. In this way, the acid-including detergent based turbine cleaning methods and systems of the present disclosure may serve to at least partially restore compliance of TBCs of gas flowpath turbine components. Additionally, for hot gas flowpath components with or without a TBC coating (e.g., include a TBC coating and/or an EBC coating or are uncoated), the turbine cleaning methods and systems of the present disclosure may restore the natural or intended aerodynamic shape and surface roughness of the components. Removal of foreign material from flowpath components via the turbine cleaning methods and systems of the present disclosure may thereby extend engine life, extend part life, reduced part scrap during maintenance of the engine, reduce operating hot-section temperatures, increase core flow, increase engine power, and/or increased compressor stall margin.

FIG. 1 illustrates a schematic of a turbine engine system 10 illustrating an acid-including detergent-based turbine cleaning method and system 11 configured to clean foreign material, such as accumulated environmental contaminants, from flowpath components (e.g., hot gas flowpath components and/or cooling circuit components) of the turbine engine 10. Turbine engine 10 may be any type of gas or combustion turbine aircraft engine including but not limited to turbofan, turbojet, turboprop, turboshaft engines as well as geared turbine engines such as geared turbofans, un-ducted fans and open rotor configurations. Alternatively, turbine engine 10 may be any type of gas or combustion turbine engine, including but not limited to land-based gas turbine engine in simple cycle, combined cycle, cogeneration, marine and industrial applications.

As shown in FIG. 1, the turbine system 10 may include a fuel injector 12, a fuel supply 14, a combustor 16, and a high pressure turbine 18. As illustrated in FIG. 1, the fuel supply 14 may route a liquid fuel and/or gas fuel to the gas turbine system 10 through the fuel injector 12 and into the combustor 16. As discussed below, the fuel injector 12 may be configured to inject and mix the fuel with compressed air. The combustor 16 may ignite and combust the fuel-air mixture, and then pass hot pressurized exhaust gas into the turbine 18. As will be appreciated, the turbine 18 may include one or more stators having fixed vanes or blades, and one or more rotors having blades which rotate relative to the stators. The hot pressurized exhaust gas may pass through the turbine rotor blades, thereby driving the turbine rotor to rotate. Coupling between the turbine rotor and a shaft 19 may cause the rotation of the shaft 19, which is also coupled to several components throughout the gas turbine system 10, as illustrated. Eventually, the exhaust of the combustion process may exit the gas turbine system 10 via an exhaust outlet 20. In some embodiments, the gas turbine system 10 may be a gas turbine system of an aircraft, in which the exhaust outlet 20 may be a nozzle through which the exhaust gases are accelerated. Acceleration of the exhaust gases through the exhaust outlet 20 (e.g., the nozzle) may provide thrust to the aircraft. As described below, the shaft 19 (e.g., in an aircraft gas turbine system 10) may be coupled to a propeller, which may provide thrust to the aircraft in addition to, or in place of, the exhaust gases accelerated through the exhaust outlet 20 (e.g., the nozzle).

The compressor 22 of the turbine system 10, as shown in FIG. 1, may include blades rigidly mounted to a rotor which is driven to rotate by the shaft 19. As air passes through the rotating blades, air pressure may increase, thereby providing the combustor 16 with sufficient air for proper combustion. The compressor 22 may intake air to the gas turbine system 10 via an air intake 24. The compressor 22 may form a portion of a flowpath 35 that extends axially through the turbine 10 and circumferentially about the shaft 19 (or axis of rotation). The compressor 22 may thereby include flowpath components.

The shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane as previously described, and so forth. The air intake 24 may draw air 30 into the gas turbine system 10 via a suitable mechanism, such as a cold air intake. The air 30 may then flow through blades of the compressor 22, which may provide compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As noted above, the combustor 16 may ignite and combust a fuel-air mixture, and then pass hot pressurized exhaust gas into the turbine 18. Components of the combustor 16 may thereby from a portion of a flowpath 35 extending axially through the turbine 10 and circumferentially about a centerline or axis of rotation 5, and therefore may be hot gas flowpath components. For example, at least a portion of combustor liners, domes, deflectors or splashplates and/or flame-holding segments of the combustor 16 may form or otherwise interact with the flowpath 35, and therefore may be gas flowpath components. The portions of the gas flowpath components of the combustor 16 that interact with the flowpath 35 may include a TBC and/or a plurality of cooling holes. As also discussed above, the hot pressurized exhaust gas may pass from the combustor 16 to and through the turbine 18. As such, components of the turbine 18 may thereby also form a portion of the flowpath 35, and therefore may be gas flowpath components. For example, at least a portion of stationary vanes or nozzles, rotating blades or buckets, and/or stationary shrouds surrounding the rotating blades of the turbine 18 may form or otherwise interact with the flowpath 35, and therefore may be gas flowpath components.

The portions of the gas flowpath components of the turbine 18 that interact with the flowpath 35 may include a TBC and/or a plurality of cooling holes. Further, the exhaust of the combustion process may flow from the turbine 18 to and through the exhaust outlet 20 to exit the gas turbine system 10. Components of the exhaust outlet 20 may thereby also form a portion of the flowpath 35, and therefore may be gas flowpath components. For example, at least a portion of nozzle boxes and/or nozzle plates of the exhaust outlet 20 may form or otherwise interact with the flowpath 35, and therefore may be gas flowpath components. The portions of the gas flowpath components of the exhaust outlet 20 that interact with the flowpath 35 may include a TBC and/or a plurality of cooling holes. Other components of the combustor 16, turbine 18, and exhaust outlet 20 may interact with the flowpath 35, and therefore may be gas flowpath components, such as seal components, valve stems, etc., and may or may not include a TBC and/or a plurality of cooling holes.

As explained above, the turbine system 10 may be susceptible to accumulation of foreign material (e.g., environmental contaminants, such as dust), within components of the turbine system 10. For example, at least the flowpath components of the compressor 22, combustor 16, turbine 18, and exhaust outlet 20 of the turbine system 10 may accumulate foreign material contaminants thereon during use of the turbine system 10. Such accumulated foreign material may include any material or combination of materials that are foreign to the turbine 10. For example, in some embodiments the foreign material contaminants may include at least one of calcium, magnesium, aluminum and silicon (e.g., $CaO$—$MgO$—$Al2O3$-$SiO2$) (and/or species thereof), often referred to as CMAS. In some embodiments, the accumulated foreign material may include airborne pollutants (e.g., sulfates, nitrates, etc.), natural evaporite deposits (e.g., halite, carbonates, etc.), dust (e.g., aluminosilicate clays) or a combination thereof. In some embodiments the accumulated foreign material may be formed, at least partially, from at least one of thermal reaction products of the foreign material and interstitial cement. The accumulated foreign material of flowpath components may become heated during turbine operation and infiltrate the porosity of the components and/or a TBC thereof, if provided, and/or at least partially plug or otherwise block at least one cooling hole thereof. Loss of porosity of a TBC via foreign material infiltration may prevent the TBC from accommodating the thermal strain mismatch between the TBC and the underlying component material beneath the TBC (e.g., a metal). The TBC may spall from the thermal strain mismatch and thereby expose the underlying component material to the harsh conditions within the flowpath 35, which may oxidize metal components for example.

Accordingly, as illustrated in FIG. 1, acid-including detergent-based turbine cleaning methods and systems 11 of the present disclosure may be utilized to clean the accumulated foreign material, such as environmental contaminants, from flowpath components of at least one of the compressor 22, combustor 16, turbine 18 and exhaust outlet 20 of the turbine system 10 (e.g., from TBCs thereof and/or cooling holes). As shown in FIG. 1, the cleaning methods and systems 11 may include introducing a flow of an acid-including detergent into the flowpath 35 and onto the portions of the flowpath components forming the flowpath 35 having one or more layers of foreign material deposited or built up thereon to clean the accumulated foreign material contaminants from the components. As the flowpath components of the turbine system 10 may be located or positioned within the compressor 22, combustor 16, the turbine 18 and the exhaust outlet 20, a flow of detergent 50 may be introduced (i.e., fluidly coupled) in a forward portion of the turbine 10. For example, as shown in FIG. 1 the flow of detergent 50 may be introduced into the flowpath 35 upstream of at least a portion of the compressor 20, as shown in FIG. 1. In other embodiments, the flow of detergent 50 may be introduced into the flowpath 35 upstream of at least a portion of the combustor 16. However, as the of the components turbine system 10 are integral or coupled together such that the flowpath 35 extends through inner portions of all the components or section of the turbine 10, at least a portion of the flow of detergent 50 may be introduced upstream of the compressor 22 such that the detergent ultimately flows into the flowpath 35 downstream therefrom, such as into a hot gas flowpath 35 (i.e., the detergent flows in the direction that gases/fuel pass through the turbine system 10). For example, the flow of detergent 50 may be introduced (e.g., fluidly coupled) into the air intake(s) 24, the compressor 22, the fuel injector(s) 12, the combustor(s) 16, the turbine 18, and/or the exhaust outlet 20.

The flowpath 35 may be substantially continuous through the components of the turbine 10 and/or may be at least partially sealed from an environment 33 outside the turbine 10. The acid-including detergent-based turbine cleaning methods and systems 11 may introduce and/or pass the detergent flow 50 through at least a portion of the flowpath 35 of the turbine system 10 in the direction that gases pass through the flowpath 35 during operation of the turbine system 10. In another embodiment, however, the acid-including detergent based turbine cleaning methods and systems 11 may introduce and/or pass the detergent flow 50 through at least a portion of the flowpath 35 of the turbine system 10 in a direction opposing the direction that gases pass through the flowpath 35 during operation of the turbine system 10, as explained further below with respect to FIGS. 3-7.

Although the gas flowpath 35 is shown on only bottom and top portions of the illustrated gas turbine system 10, the gas flowpath 35 may be an annular passageway extending in an annular direction 37 circumferentially about a longitudinal direction 39 (or axis) of the gas turbine system 10. The flow of detergent 50 may be coupled to one of the components (e.g., a first of the components, such as the air intake(s) 24 or the compressor 22) at least one inlet 36, such that the detergent flow 50 is fluidly coupled to the fluid passageway 35 at the at least one inlet 36, as shown in FIG. 1. It should be noted that, in some embodiments, the cleaning methods and systems 11 may include a delivery manifold that is coupled to a plurality of inlets 36 into to the gas turbine system 10 (e.g., an engine inlet). For example, a delivery manifold of the cleaning system and method 11 may introduce a plurality of flows of detergent 50, as described below, into the flowpath 35 via a plurality of inlets 36, such as a plurality of at least one existing port or inlet of the turbine engine 10 that is communication with the flowpath 35. In some embodiments, the at least one inlet 36 of the detergent flow 50 to the flowpath 35 may be at least one port configured as a borescope injection, as a fuel injection nozzle, for igniter plugs, or any other pre-existing inlet port in communication with the flowpath 35. As another example, the system and method 11 may include forming at least one new inlet or port 35 in the turbine engine 10 in communication with the flowpath 35, and introducing the flow of detergent 50 into the hot flowpath 35 via the at least one new port or inlet 36.

Introducing the flow of acid-including detergent into the flowpath 35 via the at least one port 36 (pre-existing or newly formed) may cause the flow of detergent 50 to flow through, an interact with components of, the compressor 16, the turbine 18, exhaust 20, cooling circuits or cooling holes of at least the compressor 16, turbine 18, and/or exhaust 20, or combination thereof. In the compressor 22, for example, the flow of detergent 50 in the flowpath 35 may interact with compressor blades and/or compressor vanes thereof. The flow of detergent 50 may be introduced generally into the flowpath 35 such that the detergent flows freely through the gas flowpath 35 as defined by the flowpath-forming components to clean the foreign material contaminants therefrom. In this way, the detergent may flow naturally through the gas flowpath 35 along substantially similar paths as gases flow therethrough during use of the turbine 10. In other embodiments, the flow of detergent 50 may be introduced into the gas flowpath 35 such that the detergent is specifically directed on one or more preselected components or portions thereof to selectively clean accumulated foreign material therefrom. In some such embodiments, the flow of detergent 50 may be directed to the one or more preselected components or portions (e.g., hot gas flow components or portions thereof) thereof, as explained further below. In some embodiments, the flow of detergent 50 may be introduced into the gas flowpath 35 both generally into the flowpath 35 and specifically directed on one or more preselected components or portions thereof.

The cleaning methods and systems 11, as shown in FIG. 1, may be configured to generate, and provide to the flowpath 35 of the gas turbine system 10, a flow of acid-including detergent 50 that dissolves, or loosens, soaks, and/or absorbs at least a portion of the foreign material (e.g., environmental contaminants) accumulated on the portions of the flowpath components forming the flowpath 35 to clean the foreign material therefrom. The cleaning methods and systems 11 may also include components or processes configured to rinse the gas turbine system 10 after the flow of detergent 50 interacts with the flowpath components of the gas turbine system 10 for a defined period of time. For example, cleaning methods and systems 11 may be configured to introduce the flow of detergent 50 into the flowpath 35 and onto the flowpath components at a temperature within 20 degrees C. to about 95 degrees C. for at least 15 minutes.

Components or processes of the cleaning methods and systems 11 may be configured to generate an acid-including detergent having particular characteristics that enable desired cleaning effects of the accumulated foreign material (e.g., environmental contaminants) of the flowpath components of the turbine 10. For example, the cleaning methods and systems 11 may generate and provide to the gas turbine system 10 an acid-including foamed liquid detergent (e.g., having a desired half-life, a desired bubble size, or both) effective in causing the flow of foamed detergent 50 to soak the accumulated foreign material on the flowpath components of the turbine system 10 for a desired period of time and with a desired effectiveness, as described below. As another example, the cleaning methods and systems 11 may generate and provide to the gas turbine system 10 an acid-including liquid detergent effective in causing the flow of detergent 50 to soak the accumulated foreign material on the flowpath components of the turbine system 10 for a desired period of time and with a desired effectiveness. As still yet another example, the cleaning methods and systems 11 may generate and provide to the gas turbine system 10 an acid-including atomized detergent effective in causing the flow of detergent 50 to soak the accumulated foreign material on the flowpath components of the turbine system 10 for a desired period of time and with a desired effectiveness.

As discussed above, the detergent utilized to clean (e.g., dissolve) the accumulated foreign material (e.g., environmental contaminants) from the flowpath components of the turbine system 10 may, for example, include at least one acid. In some embodiments the acid-including detergent may have a have pH value in the range between 2.5 and 7.0. In some embodiments, the acid-including detergent may include citric acid. In other embodiments, the acid-including detergent may include at least one acid other than citric acid (in addition to, or in place of, citric acid).

In some citric acid-including embodiments, the detergent of the flow of detergent 50 may include a first organic acidic component including citric acid within a range between about 0.1 percent and about 15 percent by volume of the detergent. In some such embodiments, the detergent may include a second organic acidic component including glycolic acid within a range between about 0.1 percent and about 15 percent by volume of the detergent. In some embodiments, the detergent may include isoropylamine sulphonate within a range between about 0.07 percent and 0.14 percent by volume of the detergent. In some embodiments, the detergent may include alcohol ethoxylate within a range between about 0.035 percent and 0.07 percent by volume of the detergent. In some embodiments, the detergent may include triethanol amine within a range between about 0.035 percent and 0.07 percent by volume of the detergent. In some embodiments, the detergent may include sodium lauriminodipropionate within a range between about 0.03 percent and 1.0 percent by volume of the detergent. In some embodiments, the detergent may include water within a range between about 68.65 percent and about 99.63 percent by volume of the detergent. In some embodiments, the detergent includes at least one of less than about 100 parts per million of sulfur, less than about 10 parts per million of sodium, less than about 20 parts per million of chlorine, less than about 10 parts per million of potassium, less than about 10 parts per million of phosphorous, less than about 2 parts per million of metals, or combinations thereof. Other suitable acid-including detergents may be used in accordance with present embodiments however, as the above described embodiments are only examples of potential acid-including detergents.

The acid-including detergent described above may be used to target (e.g., preferentially dissolve) types of accumulated foreign material (e.g., environmental contaminants) that accumulate on flowpath components of the turbine system 10 (e.g., hot gas flowpath compounds), but without stripping away materials of the components of the turbine system 10. For example, the accumulated foreign material may include a mineral dust, or naturally occurring granular material that includes particles of various rocks and minerals. For example, the accumulated foreign material may include mineral dust capable of becoming airborne at sub-38 microns in size, and accumulate in the turbine engine 10 during taxi, take-off, climb, cruise, landing, as well as when the turbine engine 10 is not in operation or utilized on land configurations. The materials, elemental composition and phases within the accumulated foreign material may vary from engine 10 to engine 10. For example, if the foreign material includes environmental contaminants, the geographical location or locations in which a particular engine 10 is utilized may affect or dictate, at least partially, the constituents or makeup of the accumulated foreign material. The location of the foreign material within the turbine engine 10 may also affect or dictate, at least partially, the constituents or makeup of the accumulated foreign material. For example, increased temperatures in the combustor 16 and/or high pressure turbine 18 sections may fuse, bond, melt, react or otherwise alter the constituents or makeup of the accumulated foreign material accumulated on flowpath components. As noted above, in some embodiments, the foreign material may include one more constituent or species of CMAS. For example, in some embodiments the accumulated foreign material may include airborne pollutants (e.g., sulfates, nitrates, etc.), natural evaporite deposits (e.g., halite, carbonates, etc.), dust (e.g., aluminosilicate clays) or combinations thereof.

The cleaning methods and systems 11 described herein generate one or more flows of acid-including detergent 50 within the flowpath 35 (e.g., flows and counterflows) that facilitate and/or effectuate removal of the accumulated foreign material described above (and similar contaminants). For example, the cleaning methods and systems 11 may target (e.g., selectively dissolve) constituents and/or species of the accumulated foreign material, such as one or more constituent and/or specie of CMAS or any other contaminant from components of the turbine 10 forming or interacting with the flowpath 35. More specifically, the flow of acid-including detergent 50 may selectively dissolve constituents and/or species of the foreign matter accumulated on the flowpath components, which may include a TBC coating, that form the flowpath 35 through the turbine engine 10. As used herein, "selectively dissolve" refers to an ability to be reactive with predetermined materials, and to be substantially unreactive with materials other than the predetermined materials. As such, the methods described herein facilitate removing reacted and unreacted foreign material (e.g., environmental contaminants) from the flowpath components while being substantially unreactive with the material used to form the hot flowpath components to limit damage thereto. In some embodiments, the material used to form the flowpath components may be a metallic material such as, but not limited to, nickel, titanium, aluminum, vanadium, chromium, iron, cobalt or combinations thereof. Dissolving constituents and/or species of the foreign matter accumulated on the flowpath components may at least reduce the risk of the contaminants redepositing on downstream portions of the engine 10, plugging cooling holes or other passageways, and/or otherwise causing harm to the engine 10.

The cleaning methods and systems 11 may be performed on the turbine engine system 10 in at least a partially assembled state of the turbine engine system 10. For example, the turbine system 10 may only be partially disassembled so as to provide access to the flowpath 35 during cleaning via the cleaning methods and systems 11. In some embodiments, the engine system 10 may be fully assembled when subjected to the cleaning methods and systems 11. If the turbine engine system 10 is an aircraft engine, the engine system 10 may be at least partially assembled and attached to the aircraft when subjected to the cleaning methods and systems 11. In such embodiments, the flow of acid-including detergent 50 may formulated to be at least compliant with on-wing requirements, such as AMS1551a, engine manufacturer compatibility testing, etc. For example, the cleaning methods and systems 11 may apply the flow of acid-including detergent 50 in a form, temperature and duration to the flowpath 35 (e.g., via at least one preexisting port or newly formed port) on an assembled and installed aircraft engine (e.g., on-wing) such that the detergent preferentially dissolves the foreign material accumulated on flowpath components, but does not present enough detergent into the turbine system 10 to prevent the engine from being restarted. In some embodiments, the cleaning methods and systems 11 may be performed on the turbine engine system 10 at piece-part, sub-assembly or assembled engine level.

As shown in FIG. 1, the cleaning methods and systems 11 may include introducing the flow of acid-including detergent 50 into the flowpath 35 in a forward portion of the turbine engine 10, such as at least upstream of a portion of the compressor 22. The flow of detergent 50 may be introduced or created within the flowpath 35 via any detergent supply mechanism in communication with the supply of detergent 52. For example, the detergent supply mechanism may include at least one pumping mechanism, at least one manifold and tubing to form the flow of detergent 50 and direct or introduce the flow of detergent 50 into the flowpath 25.

In some embodiments, the cleaning methods and systems 11 may include a detergent supply mechanism that produces a flow of foamed detergent 50. In such embodiments, the detergent supply mechanism may include a foaming nozzle having a foam chamber that receives the detergent (e.g., a liquid based detergent) from the supply of detergent 52. The cleaning methods and systems 11 may also include multiple aerators in fluid communication with the foam chamber of the foaming nozzle. An aerating gas (e.g., air) may be routed through the aerators and into the foam chamber to aerate the detergent. In some embodiments, a surfactant and/or additives may also be routed to the foam chamber of the foaming nozzle. As the aerating gas aerates the detergent (e.g., liquid detergent), foaming may occur. Specifically, in accordance with some embodiments of the present disclosure, a meta-stable detergent based foam 50 is generated within the foam chamber, and the meta-stable foamed detergent 50 is supplied to the flowpath 35 of the turbine engine 10. For example, after the foamed detergent 50 is formed, the foamed detergent 50 may be routed (e.g., blown and/or pumped and distributed through one or more manifold into a plurality of flows 50) and introduced into the flowpath 35 of the turbine 10 via one or more ports 36 of the turbine 10, such as into a forward portion of the turbine 10 and flowpath 35, as shown in FIG. 1.

The foamed detergent 50 may have particular characteristics, including at least one of a desired half-life and a desired bubble diameter of the bubbles of the foam. The desired half-life and/or the desired bubble diameter of the foamed detergent 50 may be enabled by configuration of components of the cleaning methods and systems 11, such as a size of the orifices of the aerators through which the aerating gas is routed, the type, amount, pressure, or flow rate of the detergent 50, the type, amount, pressure, or flow rate of the aerating gas used, the addition of surfactants and/or additives, and other factors described in detail below with reference to the figures. In general, the foamed detergent 50 may fully collapse (e.g., back to the volume of the materials used to generate the foam prior to generation of the foam) within 3 hours of the time the foam is generated, or in some embodiments within 5 hours of the time the foam is generated.

In some embodiments, the foamed detergent 50 includes a half-life of between 5 minutes and 180 minutes (3 hours) and/or bubbles with a bubble diameter of between 10 microns ($3.9 \times 10^{-4}$ inches) and 5 millimeters (0.2 inches). However, in other embodiments, the foamed detergent 50 may include bubble diameters between 20 microns ($7.9 \times 10^{-4}$ inches) and 4 millimeters (0.2 inches), between 30 microns ($1.2 \times 10^{-3}$ inches) and 3 millimeters (0.1 inches), between 40 microns ($1.6 \times 10^{-3}$ inches) and 2 millimeters ($7.8 \times 10^{-2}$ inches), or between 50 microns ($1.2 \times 10^{-3}$ inches) and 1 millimeter ($3.9 \times 10^{-2}$ inches). In some embodiments, the foamed detergent 50 may include a half-life between 10 minutes and 60 minutes, 15 minutes and 50 minutes, or 20 minutes and 40 minutes.

In general, "half-life" in accordance with the present disclosure refers to the amount of time it takes the foamed detergent 50 to collapse to half of the foamed detergent's initial volume after generation of the foam. Other foam characteristics, which may be related to half-life, bubble size, or both, include foam quality (e.g., the ratio of gas volume to total volume of the foam), and foam viscosity. In some embodiments, the foamed detergent 50 may include a foam quality of 85 percent or greater. In some embodiments, the foamed detergent 50 may include a foam viscosity of between 0.5 centipoise and 100 centipoise.

As noted above, after the foamed detergent 50 is generated, the detergent 50 may be delivered to one or more locations of the flowpath 35 within the turbine 10. The bubble diameter of the foamed detergent 50 may ensure the detergent 50 is deliverable to, and through, each of the one or more locations of the turbine 10, such as through the passageway or volume of the flowpath 35 of the turbine 10. For example, the bubble diameters may be sized such that the detergent 50 is capable of flowing through small passageways associated with the cleaning system, the passageway from the cleaning system to the turbine 10, and within the flowpath 35 of the turbine 10. In other words, the bubble diameters may be sized, in accordance with the present disclosure, such that the bubbles do not collapse (e.g., decay, decompose, etc.) prior to cleaning of the flowpath components of the flowpath 35 of the turbine 10.

The half-life of the foamed detergent 50 may ensure that the foamed detergent 50 remains stable for a desired soaking period of time (e.g., a desired amount of time needed to clean the flowpath 35 of the turbine 10). The foam quality may reduce an amount of detergent needed to clean the flowpath 35 of the turbine 10. The foam viscosity may ensure, as described above, that the foamed detergent 50 is deliverable to, and through, each of the one or more locations of the turbine 10, such as through the passageway or volume of the flowpath 35 of the turbine 10. The characteristics of the foamed detergent 50 may also be configured to ensure the foamed detergent 50 interacts with the components and/or surfaces of the turbine 10 that form the flowpath 35, for a sufficient time period, during aft and forward flows of the detergent 50 formed through the flowpath 35 to ensure the components and/or surfaces are cleaned, as explained further below.

As shown in FIG. 1, the cleaning methods and systems 11 may include creating a pressure differential in an aft portion of the flowpath 35 of the turbine engine 10 with respect to a forward portion of the flowpath 35 (in fluid communication with the aft portion) via an aft pressure differential generator or mechanism 56 to generate and/or control the flow of detergent 50 through the flowpath 35 to at least partially remove the foreign material from the flowpath components. In some embodiments, the aft pressure differential within the flowpath 35 may generate a flow of the detergent 50 therethrough along the direction that gasses flow therethrough during operation of the turbine 10. For example, the aft pressure differential mechanism 56 may form a pressure within the aft portion of the flowpath 35 that is less than the pressure within the forward portion of the flowpath 35. In some such embodiments, the aft pressure differential mechanism 56 may form a vacuum within the aft portion of the flowpath 35 that is less than the pressure within the forward portion of the flowpath 35 (e.g., a lesser vacuum pressure, atmospheric pressure or a positive pressure (i.e., a pressure above atmospheric pressure). In some embodiments, the aft pressure differential within the flowpath 35 may generate a flow of the detergent 50 therethrough along a direction that opposes the direction that gasses flow therethrough during operation of the turbine 10. For example, the aft pressure differential mechanism 56 may form a pressure within the aft portion of the flowpath 35 that is greater than the pressure within the forward portion of the flowpath 35. In some such embodiments, the aft pressure differential mechanism 56 may form a positive pressure within the aft portion of the flowpath 35 that is greater than the pressure within the forward portion of the flowpath 35 (e.g., a lesser positive pressure, atmospheric pressure or a vacuum pressure).

The pressure differential in the aft portion of the flowpath 35 turbine engine 10 (with respect to, or as compared to, the forward portion of the flowpath 35) may be applied to the flowpath 35 within the exhaust 35, as shown in FIG. 1. In other embodiments, the pressure differential in the aft portion of the turbine engine 10 may be applied to the flowpath 35 upstream of the exhaust 35, such as to the flowpath 35 within the turbine 18 (or upstream therefrom), such as a low pressure turbine section thereof. The pressure differential in the aft portion of the flowpath 35 may be effective in generating at least in part, a flow of detergent 50 through the flowpath 50. For example, the pressure differential in the aft portion of the flowpath 35 may draw or otherwise direct the detergent 50 within the flowpath 35 (i.e., previously introduced into the flowpath) and/or concurrently being introduced into the flowpath 35 through the flowpath 35 (e.g., at a certain flowrate) to effectuate cleaning at least a portion of the foreign material from surfaces of the flowpath components and cooling holes thereof. As another example, the pressure differential in the aft portion of the flowpath 35 may be modulated or regulated to change the degree of the pressure differential and/or the direction of the pressure differentially (i.e., the aft portion being a higher or lower pressure than the forward portion) to correspondingly generate or control the flow of detergent 50 through the flowpath 35 (or stop the flow of detergent 50) to effectively clean foreign material from surfaces of the flowpath components and cooling holes thereof. As yet another example, the pressure differential in the aft portion of the flowpath 35 may be created within at least one particular location within the flowpath 35 (e.g., angular/annular or axial location) to direct the flow of detergent 50 through the flowpath 35 such that it flows to and interacts with certain components or surfaces of the flowpath components.

The aft pressure differential mechanism 56 may be any mechanism or system that is effective in forming pressure differential within the aft portion of the flowpath 35 of the turbine engine 10 as compared to, or with respect to, the forward portion of the flowpath 35. For example, the aft pressure differential mechanism 56 may be a vacuum mechanism configured to lower the pressure within the aft portion of the flowpath 35 of the turbine engine 10 as compared to, or with respect to, the forward portion of the flowpath 35. The vacuum mechanism may be configured to remove atmosphere and/or other contents of the aft portion of the flowpath 35 (from the turbine 10 and/or flowpath 35). The aft pressure differential mechanism 56 may create a pressure drop from the forward portion to the aft portion of the flowpath 35 to generate a flow of the detergent 50 through the flowpath 35 in a direction extending from the forward portion to the aft portion. In some such embodiments, the lower pressure within the aft portion of the flowpath 35 may be a positive pressure (i.e., a pressure above atmospheric pressure), at atmospheric pressure, or vacuum pressure below atmospheric pressure. As another example, the aft pressure differential mechanism 56 may be a pressure generating mechanism configured to increase the pressure within the aft portion of the flowpath 35 of the turbine engine 10 to a pressure greater than the pressure within the forward portion of the flowpath 35. The pressure generating mechanism may be configured to add or introduce gases and/or other substances into the aft portion of the flowpath 35. In one such embodiment, the pressure generating mechanism may be configured to introduce compressed air into the aft portion of the flowpath 35. The aft pressure differential mechanism 56 may create a pressure drop from the aft portion to the forward portion of the flowpath 35 to generate a flow of the detergent 50 through the flowpath 35 in a direction extending from the aft portion to the forward portion. In some such embodiments, the higher pressure within the aft portion of the flowpath 35 may be a positive pressure, at atmospheric pressure, or vacuum pressure below atmospheric pressure. As yet another example, the aft pressure differential mechanism 56 may be both a vacuum mechanism and a pressure generating mechanism configured to selectively lower the pressure within the aft portion of the flowpath 35 of the turbine engine 10, or increase the pressure within the aft portion of the flowpath 35, with respect to the forward portion of the flowpath 35 to generate flow and counterflow of the detergent 50 through the flowpath 35. In this way, the aft pressure differential mechanism 56 may generate a flow detergent 50 through the gas flowpath 35 that extends in a direction that gases pass therethrough during operation of the turbine engine 10 and/or generate a flow of the detergent 50 through the gas flowpath 35 that extends in a direction opposing a direction that gases pass therethrough during operation of the turbine engine 10. As explained further below, the aft pressure differential mechanism 56 may generate a counterflow detergent 50 through the gas flowpath 35 that extends in a direction extending substantially counter or opposed to a flow of detergent 50 through the gas flowpath 35 generated by a forward pressure differential mechanism that creates a pressure differential in a forward portion of the flowpath 35 of the turbine engine 10, as explained below. In some embodiments, the aft pressure differential mechanism 56 itself may generate one or more flows and counterflows of detergent 50 through the gas flowpath 35 (i.e., substantially opposing directional flows of detergent 50 through the gas flowpath 35).

The aft pressure differential mechanism 56 may be any mechanism effective in forming a pressure within the aft portion the flowpath 35 of the turbine engine 10 as compared to the forward portion of the flowpath 35. In some embodiments, the aft pressure differential mechanism 56 may form a pressure differential in a plurality of locations or positioned within an aft portion of the flowpath 35. For example, a plurality of circumferential pressure differentials may be formed with in the aft portion of the flowpath 35. As another example, a plurality of pressure differentials may be formed along the flowpath direction with in the aft portion of the flowpath 35. In some embodiments, the aft pressure differential mechanism 56 may remove detergent 50 (and potentially dissolved and/or removed foreign material) from the flowpath 35 (and potentially from the turbine 10 itself), and/or introduce detergent 50 into the flowpath 35.

As also shown in FIG. 1, the cleaning methods and systems 11 may also include creating a forward pressure differential in a forward portion of the flowpath 35 of the turbine engine 10 with respect to an aft portion of the flowpath 35 (in fluid communication with the forward portion) via a forward pressure differential generator or mechanism 54 to generate and/or control the flow of detergent 50 through the flowpath 35 to at least partially remove the foreign material from the flowpath components. In some embodiments, the forward pressure differential within the flowpath 35 may generate a flow of the detergent 50 therethrough along the direction that gasses flow therethrough during operation of the turbine 10. For example, the forward pressure differential mechanism 56 may form a pressure within the forward portion of the flowpath 35 that is greater than the pressure within the aft portion of the flowpath 35. In some such embodiments, the forward pressure differential mechanism 54 may form a positive pressure within the forward portion of the flowpath 35 that is greater than the pressure within the aft portion of the flowpath 35 (e.g., a lesser positive pressure, atmospheric pressure or a vacuum pressure). In some embodiments, the forward pressure differential within the flowpath 35 may generate a flow of the detergent 50 therethrough along a direction that opposes the direction that gasses flow therethrough during operation of the turbine 10. For example, the forward pressure differential mechanism 54 may form a pressure within the forward portion of the flowpath 35 that is less than the pressure within the aft portion of the flowpath 35. In some such embodiments, the forward pressure differential mechanism 54 may form a vacuum within the forward portion of the flowpath 35 that is less than the pressure within the aft portion of the flowpath 35 (e.g., a lesser vacuum pressure, atmospheric pressure or a positive pressure (i.e., a pressure above atmospheric pressure). The forward pressure differential mechanism 54 may thereby generate a flow detergent 50 through the gas flowpath 35 that extends in a direction that gases pass therethrough during operation of the turbine engine 10 and/or generate a flow of the detergent 50 through the gas flowpath 35 that extends in a direction opposing a direction that gases pass therethrough during operation of the turbine engine 10. The forward pressure differential mechanism 54 may generate a counterflow of detergent 50 through the gas flowpath 35 that extends in a direction extending substantially counter or opposed to a flow of detergent 50 through the gas flowpath 35 generated by the aft pressure differential mechanism 56 that creates a pressure differential in an aft portion of the flowpath 35 of the turbine engine 10, as explained above. In some embodiments, the forward pressure differential mechanism 54 itself may generate one or more flows and counterflows of detergent 50 through the gas flowpath 35 (i.e., substantially opposing directional flows of detergent 50 through the gas flowpath 35).

The forward pressure differential in the forward portion of the flowpath 35 of the turbine engine 10 may be applied to the flowpath 35 within the compressor 22, as shown in FIG. 1. In other embodiments, the pressure differential in the forward portion of the flowpath 35 may be applied to the flowpath 35 upstream or downstream of the compressor 22, such as to the flowpath 35 within the intake 22 (or upstream therefrom) and/or the fuel injector 12 (or downstream therefrom). The pressure differential in the forward portion of the flowpath 35 may be effective in generating at least in part, a flow of detergent 50 through the flowpath 35. For example, the pressure differential in the forward portion of the flowpath 35 may draw or otherwise direct the detergent 50 within the flowpath 35 (i.e., previously introduced into the flowpath) and/or concurrently being introduced into the flowpath 35 through the flowpath 35 (e.g., at a certain flowrate) to effectuate cleaning of at least a portion of the foreign material from surfaces of the flowpath components and cooling holes thereof. As another example, the pressure differential in the forward portion of the flowpath 35 may be modulated or regulated to change the degree of the pressure differential and/or the direction of the pressure differentially (i.e., the forward portion being a higher or lower pressure than the aft portion) to correspondingly generate or control the flow of detergent 50 through the flowpath 35 (or stop the flow of detergent 50) to effectively clean foreign material from surfaces of the flowpath components and cooling holes thereof. As yet another example, the pressure differential in the forward portion of the flowpath 35 may be created within at least one particular location within the flowpath 35 (e.g., angular/annular or axial location) to direct the flow of detergent 50 through the flowpath 35 such that it flows to and interacts with certain components or surfaces of the flowpath components.

The forward pressure differential mechanism 54 may be any mechanism or system that is effective in forming pressure differential within the forward portion of the flowpath 35 of the turbine engine 10 as compared to, or with respect to, the aft portion of the flowpath 35. For example, the forward pressure differential mechanism 54 may be a vacuum mechanism configured to lower the pressure within the forward portion of the flowpath 35 of the turbine engine 10 as compared to, or with respect to, the aft portion of the flowpath 35. The vacuum mechanism may be configured to remove atmosphere and/or other contents of the forward portion of the flowpath 35 (from the turbine 10 and/or flowpath 35). The forward pressure differential mechanism 56 may create a pressure drop from the aft portion to the forward portion of the flowpath 35 to generate a flow of the detergent 50 through the flowpath 35 in a direction extending from the aft portion to the forward portion. In some such embodiments, the lower pressure within the forward portion of the flowpath 35 may be a positive pressure (i.e., a pressure above atmospheric pressure), at atmospheric pressure, or vacuum pressure below atmospheric pressure. As another example, the forward pressure differential mechanism 56 may be a pressure generating mechanism configured to increase the pressure within the forward portion of the flowpath 35 of the turbine engine 10 to a pressure greater than the pressure within the aft portion of the flowpath 35. The pressure generating mechanism may be configured to add or introduce gases and/or other substances into the forward portion of the flowpath 35. In one such embodiment, the pressure generating mechanism may be configured to introduce compressed air into the forward portion of the flowpath 35. The forward pressure differential mechanism 56 may create a pressure drop from the forward portion to the aft portion of the flowpath 35 to generate a flow of the detergent 50 through the flowpath 35 in a direction extending from the forward portion to the aft portion. In some such embodiments, the higher pressure within the forward portion of the flowpath 35 may be a positive pressure, at atmospheric pressure, or vacuum pressure below atmospheric pressure. As yet another example, the forward pressure differential mechanism 54 may be both a vacuum mechanism and a pressure generating mechanism configured to selectively lower the pressure within the forward portion of the flowpath 35 of the turbine engine 10, or increase the pressure within the forward portion of the flowpath 35, with respect to the aft portion of the flowpath 35 to generate flow and counterflow of the detergent 50 through the flowpath 35. In this way, the forward pressure differential mechanism 56 may generate a counterflow of the detergent 50 through the gas flowpath 35 that extends in a direction opposing a direction that gases pass therethrough during operation of the turbine engine 10 and/or generate a flow detergent 50 through the gas flowpath 35 that extends in a direction that gases pass therethrough during operation of the turbine engine 10.

The flow and/or counterflow of detergent 50 (e.g., a foamed acid-including detergent) through the flowpath 35 of the turbine 10 may continuously exposes foreign material that has built up on the flowpath components to detergent 50 (e.g., fresh detergent). The flows of detergent 50 through the flowpath 35 of the engine 10 (e.g., flows and counterflows) may thereby improve the cleaning efficiency as compared to if the detergent 50 was not formed into flows. Further, the aft and/or forward pressure differentials applied to the aft and/or forward portions of the flowpath 35 of the turbine 10 may control the flow and counterflow of detergent 50 (i.e., flows of substantially opposing directions), and potentially oscillate the flow and counterflow of detergent 50. For example, the aft pressure differential may direct the detergent 50 through the flowpath 35 along the direction that gasses normally flow through the flowpath 35 during a first time interval, and the forward pressure differential may direct the detergent 50 through the flowpath 35 along a direction that opposes the direction that that gasses normally flow through the flowpath 35 during a second time interval. As another example, the forward pressure differential may direct the detergent 50 through the flowpath 35 along the direction that gasses normally flow through the flowpath 35 during a first time interval, and the aft pressure differential may direct the detergent 50 through the flowpath 35 along a direction that opposes the direction that that gasses normally flow through the flowpath 35 during a second time interval. In a further example, the aft and/or forward pressure differentials themselves may direct the detergent 50 through the flowpath 35 along the direction that gasses normally flow through the flowpath 35 during a first time interval, and direct the detergent 50 through the flowpath 35 along a direction that opposes the direction that that gasses normally flow through the flowpath 35 during a second time interval. The first and second time intervals may be repeated any number of times in a sequential manner to form an oscillating directional flow (e.g., flows and counterflows) of detergent 50 through the flowpath 35. The cycling frequency of the flow and counterflows of detergent 50 through the flowpath 35 of the turbine 10 may be selected with respect to stability of the detergent 50, such as when the flow of detergent 50 is a flow of foamed detergent 50. For example, for a stable foamed detergent 50 that has a long half-life (such as more than about 30 minutes), a low frequency of oscillation of the directional flow of detergent 50 through the flowpath 35 may be used, such as frequency of 1 cycle every 10 minutes. For a less stable foamed detergent 50, such as having a half-life of less than 30 minutes, a higher frequency of oscillation (flow and counterflow) of the directional flow of detergent 50 may be utilized, such as frequency of 1 cycle every 2 minutes.

Figure 2:
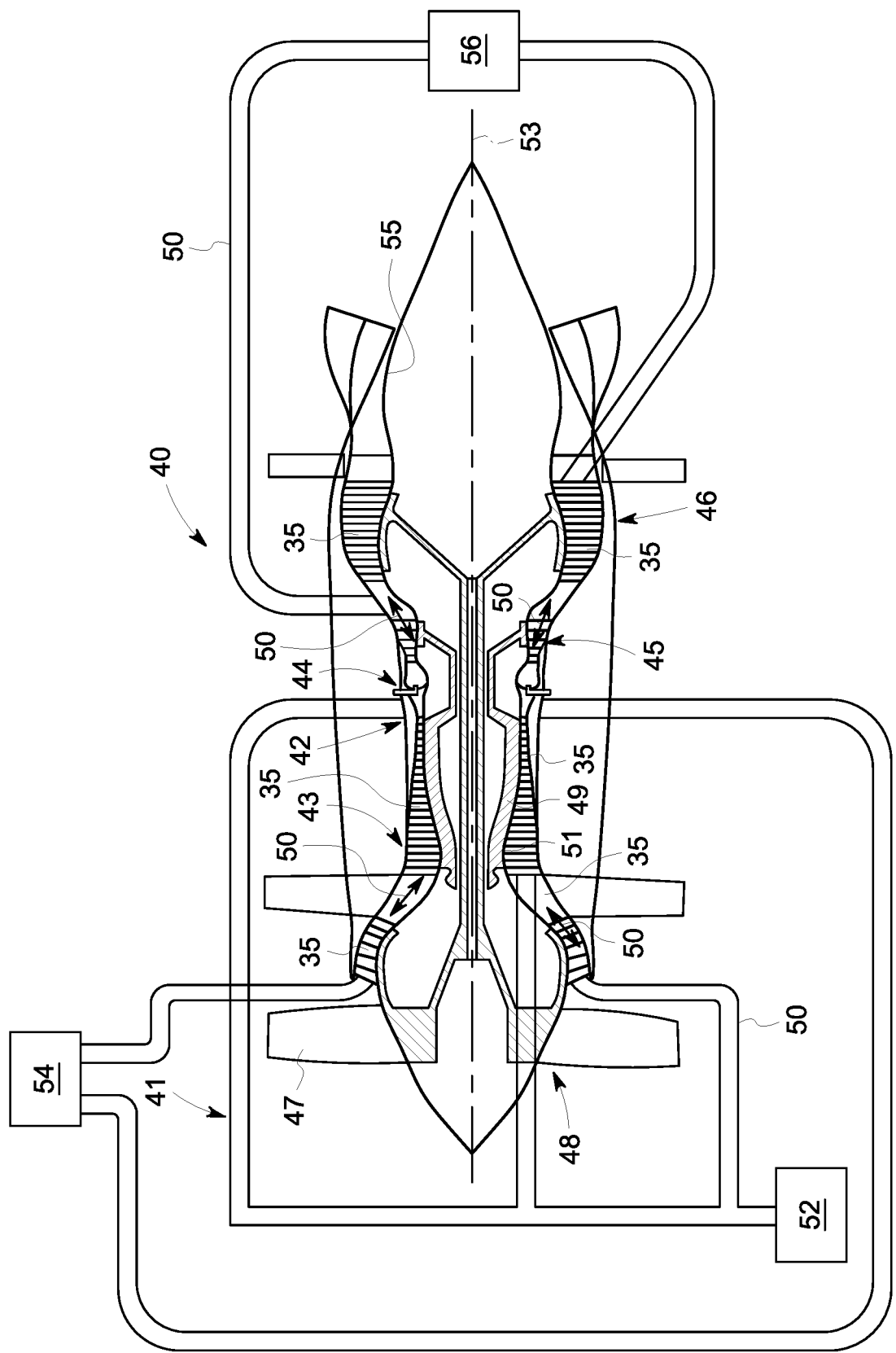
FIG. 2 is a cross-sectional schematic view of an embodiment of a turbine engine system and a cleaning method and system according to the present disclosure.
Figure 3:
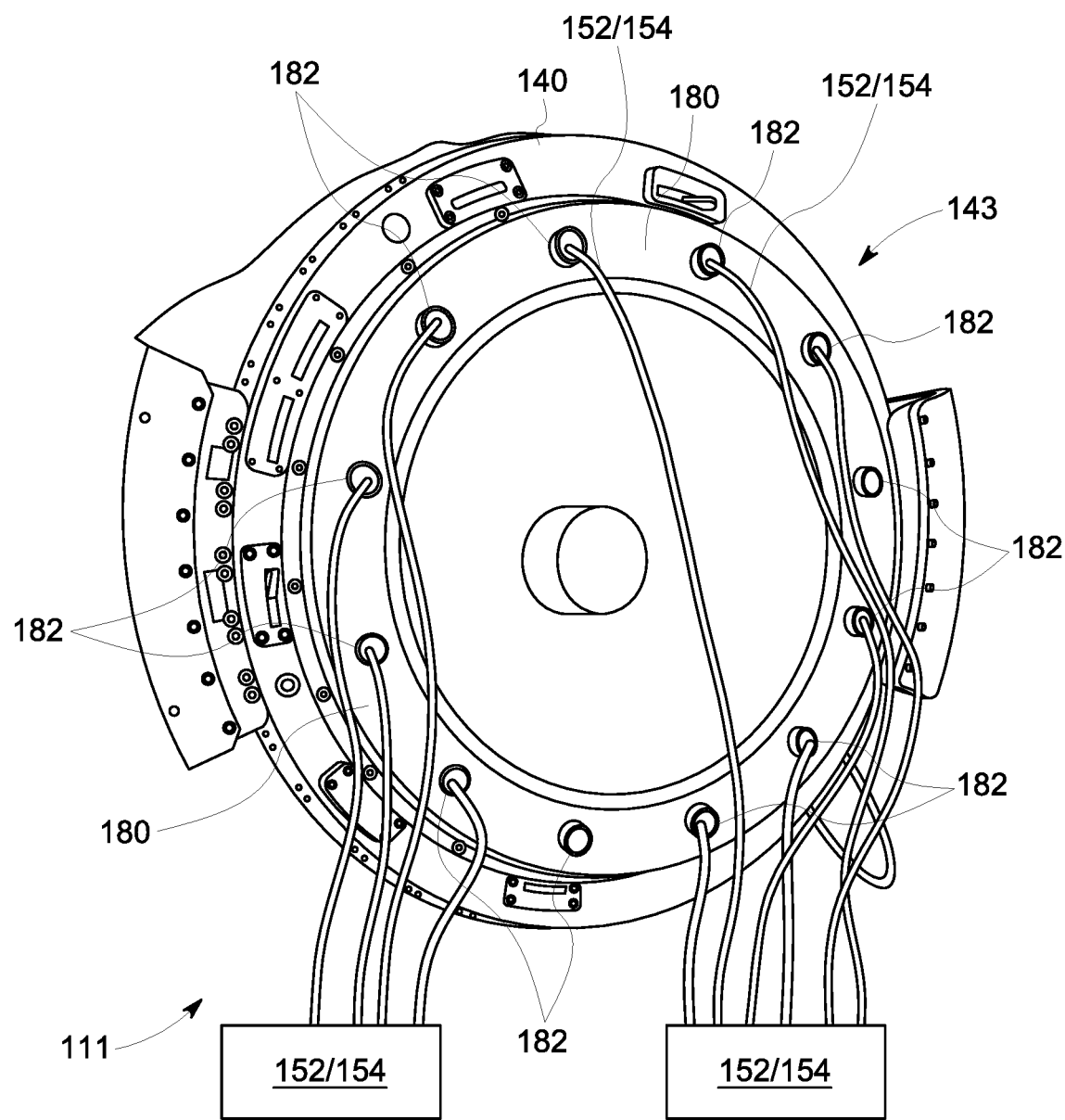
FIG. 3 is a perspective view of a forward portion of a compressor portion of a turbine engine and a turbine engine cleaning system and method according to the present disclosure.

FIG. 2 illustrates a cross-sectional schematic view of an embodiment of the cleaning methods and systems 11 and an aircraft gas turbine engine 40 (e.g., aeroderivative gas turbine engine) that includes a fan assembly 41 and a core engine 42 including a high pressure compressor 43, a combustor 44, a high-pressure turbine (HPT) 45, and a low-pressure turbine (LPT) 46. The illustrated aircraft gas turbine engine 40 may be an example of the turbine engine system 10 illustrated in FIG. 1. In the illustrated embodiment, the fan assembly 41 of the turbine engine 40 (e.g., an aircraft gas turbine engine) includes an array of fan blades 47 that extend radially outward from a rotor disk 48. The gas turbine engine 40 has an intake side (e.g., proximate the fan assembly 41) and an exhaust side (e.g., proximate the LPT 46). The fan assembly 41 and the LPT 46 are coupled by a low-speed rotor shaft 49, and the high pressure compressor 43 and the HPT 45 are coupled by a high-speed rotor shaft 51. The gas turbine engine 40 may be any type of gas or combustion turbine aircraft engine including, but not limited to, turbofan, turbojet, turboprop, turboshaft engines as well as geared turbine engines such as geared turbofans, unducted fans and open rotor configurations. Alternatively, the gas turbine engine 40 may be any time of gas or combustion turbine engine, including, but not limited to, land-based gas turbine engines in simply cycle, combined cycle, cogeneration, marine and industrial applications.

Generally, in operation, air flows axially through the fan assembly 41, in a direction that is substantially parallel to a centerline 53 that extends through the gas turbine engine 40, and compressed air is supplied to the high pressure compressor 43. The highly compressed air is delivered to the combustor 44. Combustion gas flows along the flowpath 35 from the combustor 44 and drives the high and low pressure turbines 45 and 46. The gas flow flows to the HPT 45 and the LPT 46 to rotate the HPT 45, which in turn drives the compressor 43 by way of the shaft 51, and the LPT 46 drives the fan assembly 41 by way of the shaft 49. The hot gas flow flows from the PT 45 and the LPT 46 through the exhaust 55. Components of the fan assembly, 41, compressor 53, combustor 44, HPT 45, the LPT 46 and exhaust 55 may thereby from a portion of the flowpath 35. As discussed above, foreign material (e.g., environmental contaminates including Na—Mg—Ca sulfate, aluminosilicate clays and CMAS) may accumulate on the flowpath components of the fan assembly 41, compressor 43, combustor 44, HPT 45, the LPT 46 and exhaust 55.

As shown, the cleaning methods and systems 11 may supply the flow of acid-including detergent 50 (e.g., a flow of foamed citric acid-including detergent) to any number of inlets to a forward portion of flowpath 35 of the gas turbine engine 40. For example, as shown in FIG. 2 the methods and systems 11 may supply the flow of detergent 40 directly to the flowpath 35 within the compressor 43 and/or the combustor 44. In some embodiments, the cleaning methods and systems 11 may supply the flow of acid-including detergent 50 (e.g., a flow of foamed citric acid-including detergent) to any number of inlets to an aft portion of flowpath 35 of the gas turbine engine 40, such as within the turbine section (in addition to, or instead of, to a forward portion of the flowpath 33). The methods and systems 11 may apply the aft pressure differential 56 to an aft portion of the flowpath 35 downstream of the introduction of the flow of detergent 50 and/or proximate to the introduction of the flow of detergent 50 (i.e., the detergent 50 may be introduced in the forward and/or aft portions of the flowpath 35).

As shown in FIG. 2 the aft pressure differential 56 may be applied to the flowpath 35 within the turbine section (e.g., within the HPT 45 and/or the LPT 46) and/or within the exhaust section of the turbine 10. In this way, the aft pressure differential 56 may control the flow of detergent 50 through the flowpath 35 through at least a portion of the compressor 43, combustor 44 and turbine section (e.g., the HPT 45 and/or the LPT 46) (and potentially though at least a portion of the fan assembly 41 and exhaust 55) via the aft portion of the flowpath to remove foreign material from the components thereof. As also shown in FIG. 2, the methods and systems 11 may apply the forward pressure differential 54 to a forward portion of the flowpath 35 to control or form a flow of detergent 50 along the flowpath 35 of the turbine 10. The pressure differential 54 may control a flow of detergent 50 within the flowpath 35 through at least a portion of the compressor 43, combustor 44 and turbine section (e.g., the HPT 45 and/or the LPT 46) (and potentially though at least a portion of the fan assembly 41 and/or exhaust 55) via the forward portion of the flowpath 35 to remove foreign material from the components thereof. Further, as explained above, the aft pressure differential 56 and/or the forward pressure differential 54 may operate in an oscillating sequence and/or directional pressure difference to form cycles of flow and counterflow of detergent 50 (e.g., foamed citric-acid including detergent) through the flowpath 35 to remove foreign material from the components thereof.

As previously described, the detergent utilized to clean (e.g., dissolve) accumulated foreign material on the flowpath components of the turbine system 40 may include at least one acid. In some embodiments, the acid-including detergent may have a have pH value in the range between 2.5 and 7.0. In some embodiments, the acid-including detergent may include citric acid. In other embodiments, the acid-including detergent may include at least one acid other than citric acid (in addition to, or in place of, citric acid).

In some citric acid-including embodiments, the detergent may include a first organic acidic component including citric acid within a range between about 0.1 percent and about 15 percent by volume of the detergent. In some such embodiments, the detergent may include a second organic acidic component including glycolic acid within a range between about 0.1 percent and about 15 percent by volume of the detergent. In some embodiments, the detergent may include isoropylamine sulphonate within a range between about 0.07 percent and 0.14 percent by volume of the detergent. In some embodiments, the detergent may include alcohol ethoxylate within a range between about 0.035 percent and 0.07 percent by volume of the detergent. In some embodiments, the detergent may include triethanol amine within a range between about 0.035 percent and 0.07 percent by volume of the detergent. In some embodiments, the detergent may include sodium lauriminodipropionate within a range between about 0.03 percent and 1.0 percent by volume of the detergent. In some embodiments, the detergent may include water within a range between about 68.65 percent and about 99.63 percent by volume of the detergent. In some embodiments, the detergent includes at least one of less than about 100 parts per million of sulfur, less than about 10 parts per million of sodium, less than about 20 parts per million of chlorine, less than about 10 parts per million of potassium, less than about 10 parts per million of phosphorous, less than about 2 parts per million of metals, or combinations thereof. Other suitable acid-including detergents may be used in accordance with present embodiments however, as the above described embodiments are only examples of potential acid-including detergents.

FIGS. 3-7 illustrate another embodiment of the turbine engine cleaning system and method 111 applied to an exemplary turbine engine 140. The turbine engine cleaning system and method 111 and turbine engine 140 of FIGS. 3-7 may be substantially similar to the turbine engine cleaning system and method 11 and turbine engine 40 of FIG. 2, and therefore like reference numerals preceded by the numeral "1" are used to indicate like features or aspects, and the description with respect to turbine engine cleaning system and method 11 and turbine engine 40 may equally apply to turbine engine cleaning system and method 111 and turbine engine 140. In some embodiments, the turbine engine cleaning system and method 111 may be utilized to clean the flowpath 135 of the core 142 of the engine 140 with the flow or detergent 150 (e.g., foamed detergent as described above) and the forward pressure differential 154 applied to the flowpath 135 in the forward portion of the compressor section 143, and the aft pressure differential 156 applied to the flowpath 135 in the aft portion of the engine 140, such as in an aft portion of the core 142 (e.g., within the turbine section, such as in the low-pressure turbine (LPT) section 146), as shown in FIGS. 3-7.

In some embodiments, the fan assembly, exhaust and/or other components of the turbine engine 140 may be removed from the turbine engine 140 to expose or provide more readily available access to the flowpath 135 of the engine 140, such as the flowpath 135 of the core 142 of the engine 140, during the cleaning methods 111. Components of the turbine engine 140 may be removed from the turbine engine 140 to expose or provide more readily available access to the flowpath 135 of the high pressure compressor section 143, the combustor 144 section, the high-pressure turbine (HPT) section 145, and/or the low-pressure turbine (LPT) section 146. As shown in FIGS. 3-7, in some embodiments the fan assembly and/or related components may be removed from the turbine engine 140 to provide access to the forward portion of the flowpath 135 of the compressor section 143, such as at proximate to the flowpath 135 at the inlet of the core 142 of the turbine engine 140, for the introduction of the flow of detergent 150 thereto and/or the generation of the forward pressure differential 154 therein (via one or more distribution plug, for example). As also shown in FIGS. 4-7, in some embodiments the exhaust and/or related components may be removed from the turbine engine 140 to provide access to the aft portion of the flowpath 135 of the turbine section, such as the flowpath 135 in the aft portion or end of the LPT section 146, for the introduction of the flow of detergent 150 thereto and/or for the generation of the aft pressure differential 156 therein (via one or more distribution plug, for example). In other embodiments, the fan assembly, exhaust and/or other components may not be removed from the turbine engine 140 during, or in preparation for, the cleaning methods 111. For example, in some embodiments the fan assembly and/or related components of the engine 140 may remain on the engine 140 while the cleaning systems and methods 111 introduce the flow of detergent 150 and/or generate the forward pressure differential 154 in the flowpath 135 at a forward portion of the compressor section 143 of the core 142 of the engine 140 (via one or more distribution plug, for example). Similarly, in some embodiments the exhaust and/or related components may remain on the engine 140 while the cleaning systems and methods 111 introduce the flow of detergent 150 and/or generate the aft pressure differential 156 in the flowpath 135 at an aft portion of the turbine section of the core 142 of the engine 140, such as in the flowpath 135 at an aft portion of the LPT section 146 (via one or more distribution plug, for example).

Figure 5:
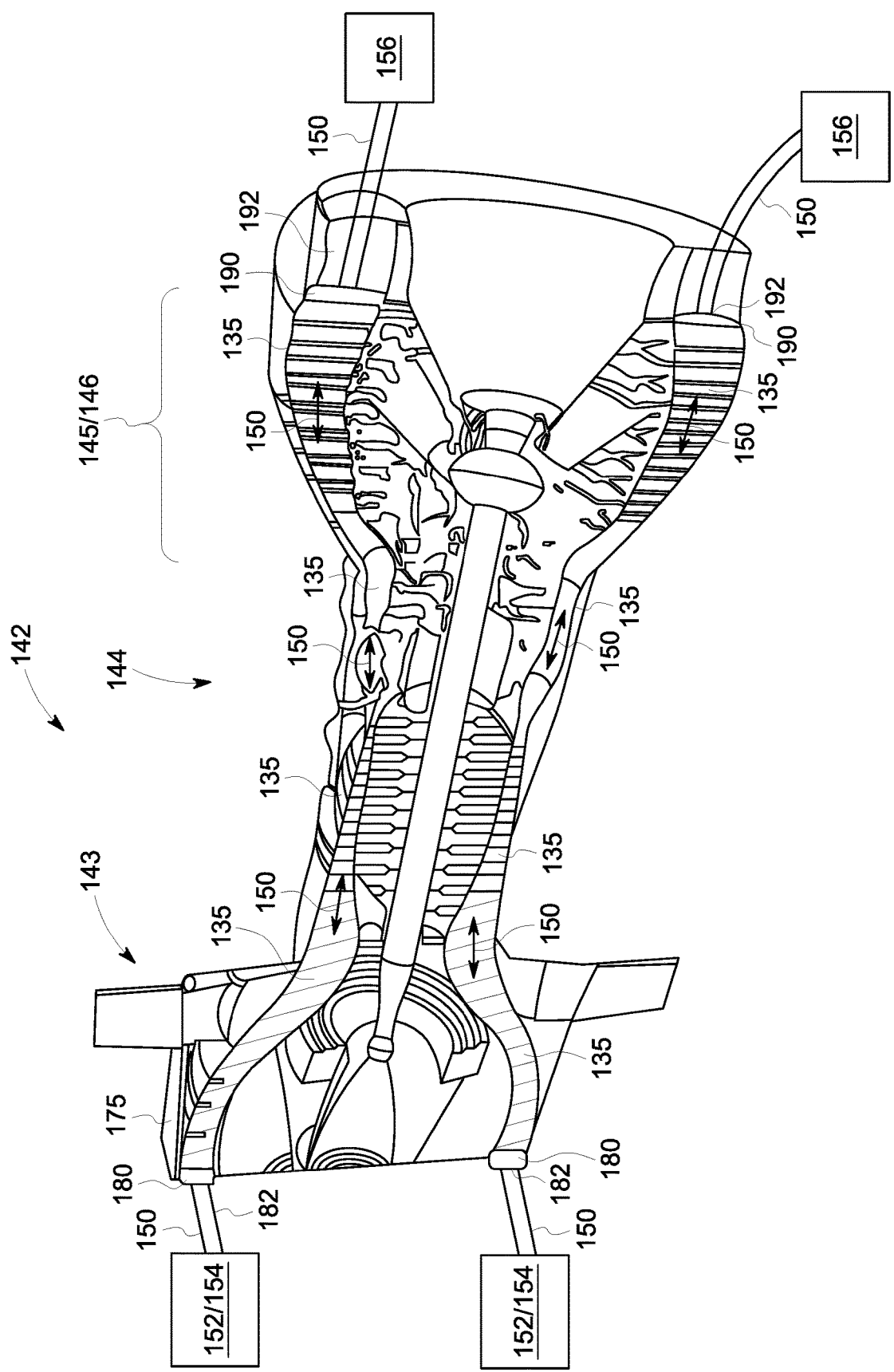
FIG. 5 is a cross-sectional perspective view of the turbine engine and turbine engine cleaning system and method of FIG. 3.
Figure 6:
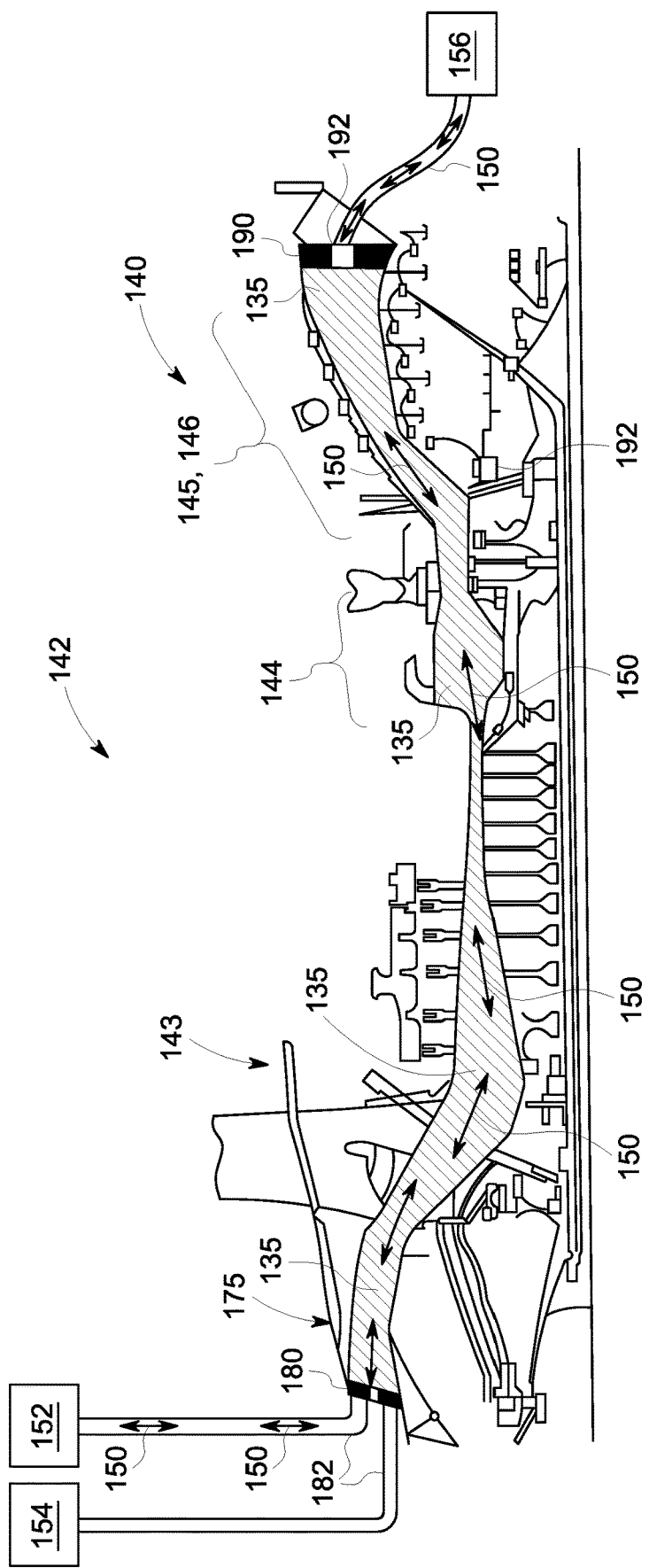
FIG. 6 is a cross-sectional schematic view of a portion of the turbine engine and turbine engine cleaning system and method of FIG. 3.
Figure 7:
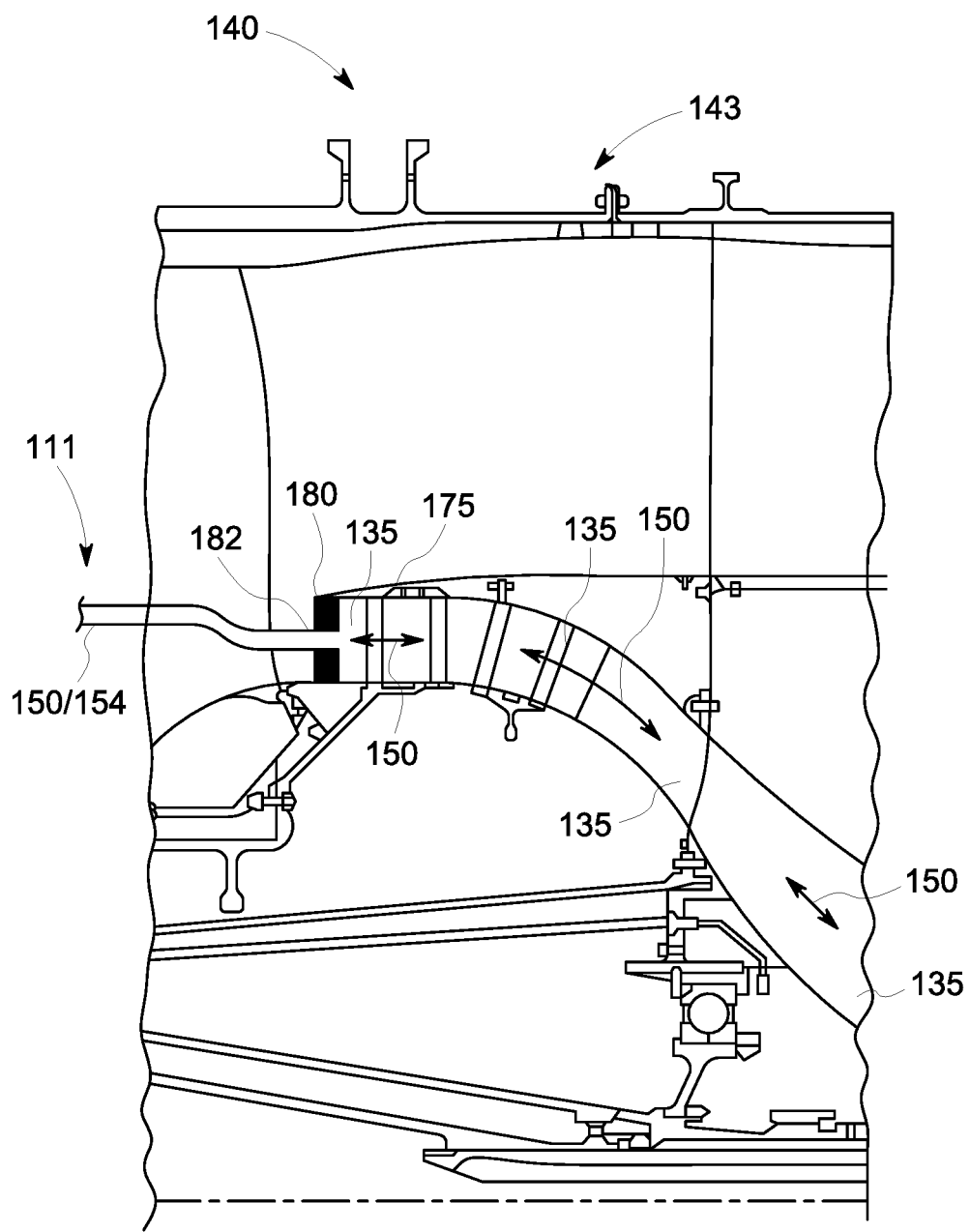
FIG. 7 is an enlarged cross-sectional schematic view of the forward portion of the turbine engine and turbine engine cleaning system and method of FIG. 3.

As shown in FIGS. 3 and 5-7, the turbine engine cleaning system and method 111 may be utilized to clean the flowpath 135 of the core 142 of the engine 140 with the flow or detergent 150 (e.g., foamed detergent) and/or forward pressure differential 154 applied to the flowpath 135 or proximate to the entrance of the flowpath 135 to the compressor section 143 of the turbine engine 140. The introduction of the flow or detergent 150 (e.g., foamed detergent) and/or the application of the forward pressure differential 154 may be applied at or proximate to the leading edge of a splitter or bypass 175 that splits the air from the intake, as shown in FIGS. 5-7. The splitter 175 may be axially and radially disposed adjacent to and downstream of the intake and split the air supplied by the intake, as shown in FIGS. 5-7. The splitter 175 may split the air supplied by the intake into the inlet of the flowpath 135 of the compressor 143 of the core 142 of the engine 140 (i.e., into the "core engine inlet") and around the compressor 143 as shown in FIGS. 5-7. In some embodiments, the air from the intake that is directed around the compressor 143 by the splitter 175 may flow through a bypass duct and directed downstream to provide thrust for the engine 140.

As shown in FIGS. 3 and 5-7, the turbine engine cleaning system and method 111 may include a forward distribution plug 180 with a plurality of forward ports 182 extending therethrough. The forward distribution plug 180 may be configured to substantially block-off or plug the flowpath of the flowpath 135 of the compressor 143 but for the forward ports 182. For example, as shown in FIGS. 3 and 5-7 the forward distribution plug 180 may be coupled to the engine 140 at or proximate to the splitter 175 to substantially block-off the inlet of the flowpath 135 of the compressor 143 of the core 142 of the engine 140 (i.e., the core engine inlet). The forward distribution plug 180 may be configured to fit within or otherwise substantially seal at least a forward portion of the flowpath 135 of the compressor 143, such as the core engine inlet. As show in FIGS. 3 and 5-7, the forward distribution plug 180 may be annular or circumferential to block-off the annular or circumferential flowpath 135 of the compressor 143, such as the annular or circumferential core engine inlet. In some embodiments, the outer diameter or peripheral surface of the forward distribution plug 180 may correspond to the inner diameter or surface of the splitter 175 (e.g., at or proximate to the leading edge thereof), and/or the inner diameter or surface of the forward distribution plug 180 may correspond to the outer diameter or peripheral surface of the flowpath component(s) of the compressor 143 (e.g., at or proximate to the core engine inlet). In some embodiments, the forward distribution plug 180 may be formed of a plurality of modular interconnecting segments that removably couple with each other to form the forward distribution plug 180. In some such embodiments, the segments of the forward distribution plug 180 may be coupled or assembled within the flowpath 135 of the compressor 143 (or immediately there-before). In some embodiments, the forward ports 182 may be removable or modular from the forward distribution plug 180.

The forward distribution plug 180 may be configured to substantially block-off or plug the flowpath of the flowpath 135 of the compressor 143 but for the forward ports 182. The forward ports 182 may provide a flowpath or passageway though the forward distribution plug 180, and thereby into or to the flowpath 135 of the compressor 143, such as at or proximate to the core engine inlet, as shown in FIGS. 3 and 5-7. The ports 182 may allow for tubing, piping or the like of the detergent supply mechanism to couple thereto or therewith and allow the flow of the detergent 150 (e.g., foamed detergent) to flow into the flowpath 135 of the compressor 143, such as at or proximate to the core engine inlet. Similarly, the ports 182 may allow for tubing, piping or the like of the forward pressure differential mechanism 154 to couple thereto or therewith and allow the forward pressure differential to be created in the flowpath 135 of the compressor 143, such as at or proximate to the core engine inlet. The forward distribution plug 180 may thereby distribute the flow of detergent 150 and/or the forward pressure differential 154 to the flowpath 135 of the compressor 143, such as at or proximate to the core engine inlet.

When not in use, the forward ports 182 may be substantially closed or sealed. As shown in FIGS. 3 and 5-7, the forward ports 182 may be circumferentially disposed or spaced about the axis of the turbine engine 140. In this way, the flow of detergent 150 and/or the forward pressure differential 154 may be applied to different circumferential portions of the flowpath 135 to ensure the entirety or a specific portion(s) of the flowpath 135 is acted on by the flow of detergent 150. In some embodiments, the flow of detergent 150 may be applied to one or more first forward ports 182 of the forward distribution plug 180, and the forward pressure differential 154 may be applied to one or more second forward ports 182 of the forward distribution plug 180 that are different from the first forward ports 182. In some other embodiments, the flow of detergent 150 and the pressure differential 154 may be applied to one or more of the same forward ports 182 of the forward distribution plug 180.

As shown in FIGS. 4-7, the turbine engine cleaning system and method 111 may be utilized to clean the flowpath 135 of the core 142 of the engine 140 with the flow or detergent 150 (e.g., foamed detergent) and/or the aft pressure differential 156 applied to an aft portion of the core 142 of the engine 140, such as applied to the turbine portion of the engine 140. In some embodiments, the flow or detergent 150 and/or the aft pressure differential 156 may be applied to the low-pressure turbine (LPT) section 146 of the core 142 of the engine 140, as shown in FIGS. 4-7. For example, flow or detergent 150 and/or the aft pressure differential 156 may be applied to the LPT section 146 (or the high-pressure turbine (HPT) section 145), such as an aft portion or end thereof, of the core 142 of the engine 140. In some such embodiments, the exhaust or other components may be removed from the core 142 of the engine 140 as to provide access to the flowpath 135 of the LPT section 146. In some other embodiments, the flow or detergent 150 and/or the aft pressure differential 156 may be applied the LPT section 146 of the core 142 of the engine 140 with the exhaust installed on the engine 140.

Figure 4:
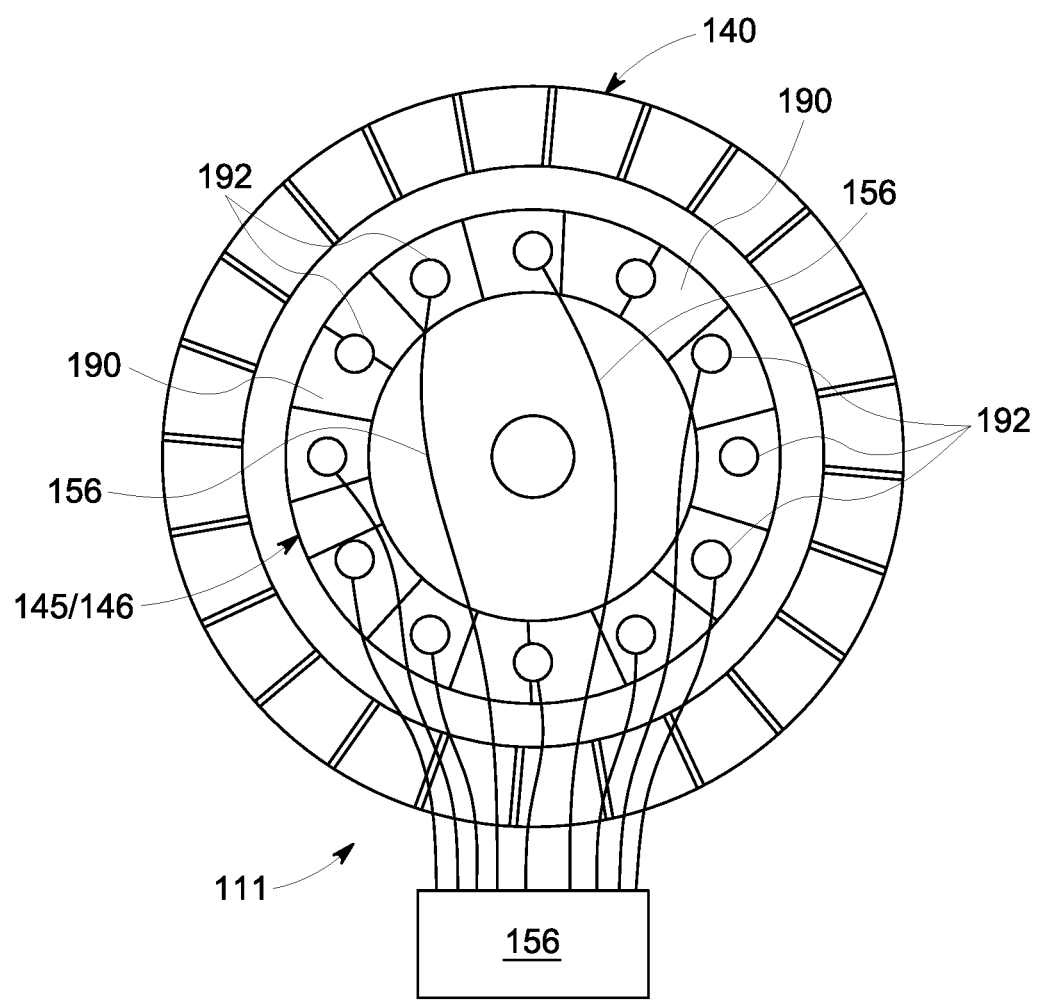
FIG. 4 is a cross-sectional schematic view illustrating an aft portion of a turbine portion of the turbine engine and turbine engine cleaning system and method of FIG. 3.

As shown in FIGS. 4-6, the turbine engine cleaning system and method 111 may include an aft distribution plug 190 with a plurality of aft ports 192 extending therethrough. The aft distribution plug 190 may be configured to substantially block-off or plug the flowpath 135 of the turbine section, such as the LPT section 146, but for the aft ports 192. For example, as shown in FIGS. 4-6 the aft distribution plug 190 may be coupled to the engine 140 in an aft portion of the turbine section of the core 142, such as in an aft portion or end of the LPT section 146, to substantially block-off the respective portion of the flowpath 135 therethrough. The aft distribution plug 190 may be configured to fit within or otherwise substantially seal at least an aft portion of the flowpath 135 of the turbine section, such as in the LPT section 146. As shown in FIGS. 4-6, the aft distribution plug 190 may be annular or circumferential to block-off the annular or circumferential flowpath 135 of the turbine section, such as the annular or circumferential flowpath 135 of the LPT section 146. In some embodiments, the outer diameter or peripheral surface of the aft distribution plug 190 may correspond to the inner diameter or surface of the flowpath component(s) of the aft portion of the turbine section (e.g., the LPT section 146), and/or the inner diameter or surface of the aft distribution plug 190 may correspond to the outer diameter or peripheral surface of flowpath component(s) of the aft portion of the turbine section (e.g., the LPT section 146). In some embodiments, the aft distribution plug 190 may be formed of a plurality of modular interconnecting segments that removably couple with each other to form the aft distribution plug 190. In some such embodiments, the segments of the aft distribution plug 190 may be coupled or assembled within the flowpath 135 of the LPT section 146 (or immediately there-before). In some embodiments, the aft ports 192 may be removable or modular from the aft distribution plug 190.

The aft distribution plug 190 may be configured to substantially block-off or plug the flowpath 135 of the aft portion of the turbine section but for the aft ports 192. The aft ports 192 may provide a flowpath or passageway though the aft distribution plug 190, and thereby into or to the flowpath 135 of the of the turbine section, such as in an aft portion of the turbine section (e.g., within the LPT section 146), as shown in FIGS. 4-6. The aft ports 192 may allow for tubing, piping or the like of the detergent supply mechanism to couple thereto or therewith and allow the flow of the detergent 150 (e.g., foamed detergent) to flow into the flowpath 135 of the turbine section, such as within the LPT section 146 (e.g., at or proximate to the aft end of the flowpath 135 of the LPT section 146). Similarly, the aft ports 192 may allow for tubing, piping or the like of the aft pressure differential mechanism 156 to couple thereto or therewith and allow the aft pressure differential to be created in the flowpath 135 of the of the turbine section, such as within the LPT section 146 (e.g., at or proximate to the aft end of the flowpath 135 of the LPT section 146). The aft distribution plug 190 may thereby distribute the flow of detergent 150 and/or the aft pressure differential 156 to the flowpath 135 of the of the turbine section, such as within the LPT section 146 (e.g., at or proximate to the aft end of the flowpath 135 of the LPT section 146).

When not in use, the aft ports 192 may be substantially closed or sealed. As shown in FIGS. 4-7, the aft ports 192 may be circumferentially disposed or spaced about the axis of the turbine engine 140. In this way, the flow of detergent 150 and/or the aft pressure differential 156 may be applied to different circumferential portions of the flowpath 135 to ensure the entirety or a specific portion(s) of the aft portion of the flowpath 135 is acted on by the flow of detergent 150. In some embodiments, the flow of detergent 150 may be applied to one or more first aft ports 192 of the aft distribution plug 190, and the aft pressure differential 156 may be applied to one or more second aft ports 192 of the aft distribution plug 190 that are different from the first aft ports 192. In some other embodiments, the flow of detergent 150 and the aft pressure differential 156 may be applied to one or more of the same aft ports 192 of the aft distribution plug 190.

As described above, the cleaning methods and system 111 may effectively clean (e.g., dissolve) foreign material from the flowpath components of the core 142 of the engine 140. As shown in FIGS. 5 and 6, the flow of detergent 150 may be introduced into the flowpath 135 of the compressor section 143 (e.g., at or proximate to the core engine inlet) of the engine core 142 via one or more forward ports 182 of the forward distribution plug 180, and/or the forward pressure differential 154 may be applied to the flowpath 135 of the compressor section 143 (e.g., at or proximate to the core engine inlet) via one or more forward ports 182 of the forward distribution plug 180. Similarly, the flow of detergent 150 may be introduced into the flowpath 135 of the turbine section (e.g., within the LPT section 146 (or the HPT section 145 or)) of the engine core 142 via one or more aft ports 192 of the aft distribution plug 190, and/or the aft pressure differential 156 may be applied to the flowpath 135 of the turbine section (e.g., within the LPT section 146 (or the HPT section 145 or)) of the engine core 142 via one or more aft ports 192 of the aft distribution plug 190.

The aft pressure differential 156 may thereby generate a flow (e.g., flows and/or counterflows) of detergent 150 (e.g., foamed detergent) through the flowpath 135 of the core 142 (e.g., through at least a portion of the compressor 143, combustor 144 and HPT and LPT turbine sections 145, 146 of the core 142) via the aft portion of the flowpath 135 of the core 142 such that the flow of detergent 150 interacts with the flowpath components thereof to remove (e.g., dissolve) foreign material accumulated thereon. Further, the forward pressure differential 154 may thereby generate a flow (e.g., flows and/or counterflows) of detergent 150 (e.g., foamed detergent) through the flowpath 135 of the core 142 (e.g., through at least a portion of the compressor 143, combustor 144 and HPT and LPT turbine sections 145, 146 of the core 142) via the forward portion of the flowpath 135 of the core 142 such that the flow of detergent 150 interacts with the flowpath components of the core 142 to remove (e.g., dissolve) foreign material accumulated thereon. Also, if desired, the aft pressure differential 156 and/or the forward pressure differential 154 may form cycles of flows and counterflows of detergent 150 (e.g., via the aft and forward distribution plugs 180, 190) through the flowpath 135 of the core 142 of the engine 140 to ensure the detergent 150 interacts with the flowpath components thereof to clean (e.g., dissolve) foreign material therefrom.

Figure 8:
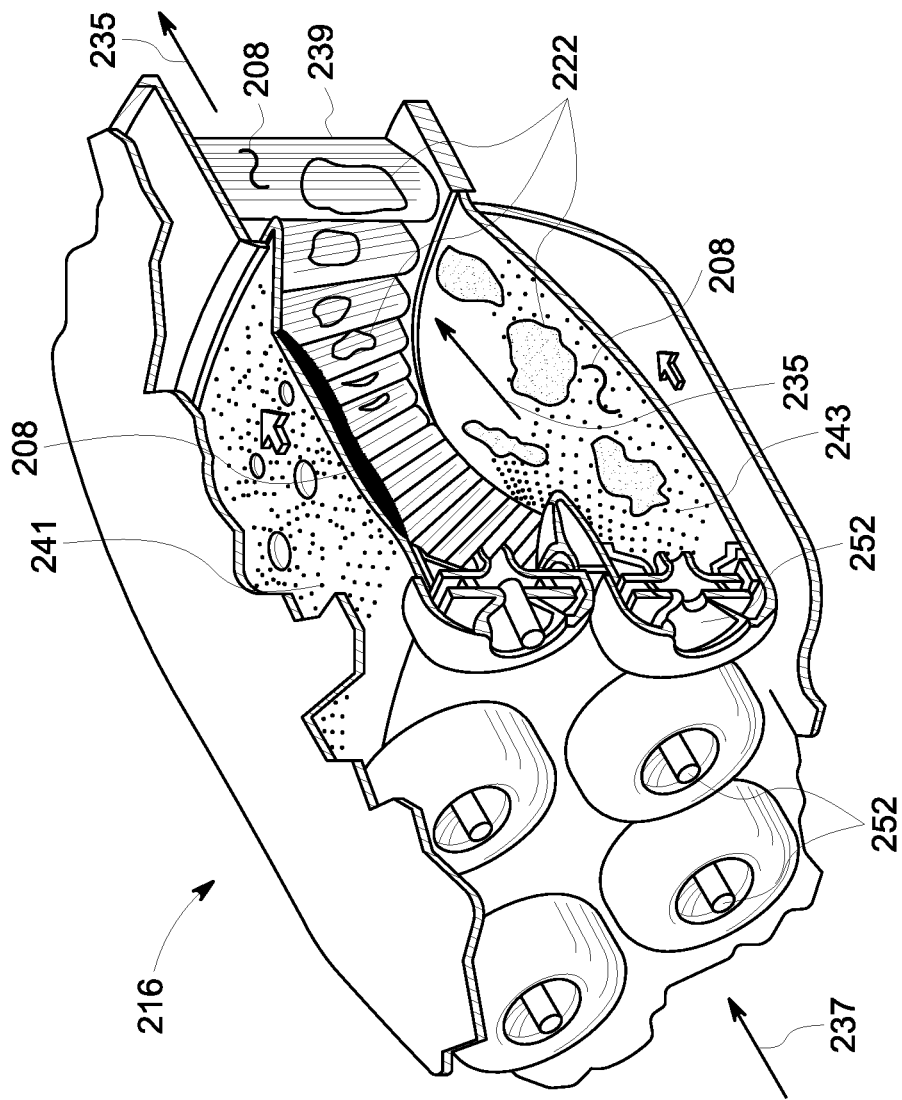
FIG. 8 is a cross-sectional schematic view of a combustion section of a turbine engine including gas path components with accumulated foreign material contaminants thereon according to the present disclosure.

Referring now to FIG. 8, a perspective view of a combustor or combustion section 216 of a turbine engine (e.g., the turbine engine system 10, 40, 140 described above) positioned in a compressor discharge flow 237 in energized fluid supply communication with a turbine section (denoted by turbine blades 239), is depicted. As shown in FIG. 8, the combustion section 216 includes axially and circumferentially extending outer and inner combustor liners 241 and 243, respectively, radially spaced from each other to define a portion of the flowpath 235 (e.g., a hot gas flowpath) (and combustion zone) therebetween. Disposed at the upstream end of the combustor liners 241 and 243 is a plurality of fuel injectors 252 mounted within a plurality of apertures in a combustor dome of the combustor section 216. As noted above, in one embodiment the ports for the fuel injectors 252 may be utilized for the introduction of the flow of detergent and/or the creation of the aft or forward pressure differentials in the flowpath 235 (however, as also noted above, other avenues for introducing the flow of detergent and/or creating the aft or forward pressure differentials in the flowpath 235 may alternatively be utilized).

Portions of the combustion section 216 of a turbine engine may develop foreign material 222, such as environmental contaminants, accumulated on a portion or surface 208 that forms or interacts with the flowpath 235 of the turbine engine. For example, as shown in FIG. 8 surfaces 208 of the combustor liners 241 and 243 and blades 239 that form or interact with the hot gas flowpath 235 of the combustion section 216 of the turbine engine may include foreign material 222 accumulated thereon. While FIG. 8 depicts a combustion section 216 of a turbine engine, components interacting with the flowpath 235 with accumulated foreign material 222 are not limited to the combustion section 216 of a turbine engine and may be present in the compressor, fuel injection, turbine and/or exhaust sections of a turbine, for example. In some embodiments, foreign material 222 may accumulate on any of liners, shrouds, buckets, blades, nozzles, vanes, seal components, valve stems, nozzle boxes, and nozzle plates.

The methods and systems of the present disclosure may remove at least a portion of the foreign material 222 within the flowpath 235 of the combustion section 216 via the flow of detergent therethrough. For example, the pressure differential may be created within the flowpath 235 downstream of the blades 239 to generate and/or control the flow of detergent through the flowpath 235 such that the flow of detergent interacts with the surfaces 208 of the combustor liners 241 and 243 and blades 239 to clean (e.g., dissolve) the foreign material 222 therefrom. Similarly, the pressure differential may be created within the flowpath 235 upstream of the combustor liners 241 and 243 (such as via the apertures of the fuel injectors 252 or upstream thereof) to generate and/or control the counterflow of detergent through the flowpath 235 such that the flow of detergent interacts with the surfaces 208 of the combustor liners 241 and 243 and blades 239 to clean (e.g., dissolve) the foreign material 222 therefrom. Further, cycles of flows and counterflows of detergent may be generated and/or controlled through the flowpath 235 (e.g., via the aft and forward pressure differentials) to ensure the detergent interacts with the surfaces 208 of the combustor liners 241 and 243 and blades 239 to clean (e.g., dissolve) at least some of the foreign material 222 therefrom.

FIGS. 9A and 9B illustrates a pair of blades 370A, 370B of a compressor of a turbine engine before and after cleaning via the cleaning methods and systems of the present disclosure, as explained above. As shown in FIG. 9A, at least a majority of the outer surfaces 308 of the blades 370A, 370B include foreign material 323 accumulated thereon, such as environmental contaminates. The foreign material 323 may have been deposited on the outer surface 308 of the blades 370A, 370B during operation of the compressor. The foreign material 323 may have passed through the flowpath of the turbine (e.g., the hot gas flowpath) and become deposited on the outer surfaces 308 of the blades 370A, 370B. Further, elevated temperatures within the flowpath of the compressor may have bonded or fused (at least partially) the foreign material 323. However, as shown in FIG. 9B, the application of a flow of detergent through the flowpath via the forward and/or aft pressure differentials, the counterflow of detergent through the flowpath via the forward and/or aft pressure differentials, and/or a cyclic application of flows and counterflows of the detergent through the flowpath via the forward and/or aft pressure differentials, can effectively remove at least a substantial portion of the foreign material 323 from the outer surfaces 308 of the blades 370A, 370B. It is noted that the blades 370A, 370B may be cleaned via turbine cleaning methods ad system of the present disclosure while coupled or installed within the compressor.

It is to be understood that the above description is intended to be illustrative, and not restrictive. Numerous changes and modifications may be made herein by one of ordinary skill in the art without departing from the general spirit and scope of the inventions as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the inventions have been described in detail in connection with only a limited number of embodiments, it should be readily understood that the inventions are not limited to such disclosed embodiments. Rather, the inventions can be modified to incorporate any number of variations, alterations, substitutions or equivalent arrangements not heretofore described, but which are commensurate with the spirit and scope of the inventions. Additionally, while various embodiments of the inventions have been described, it is to be understood that aspects of the disclosure may include only some of the described embodiments. Accordingly, the inventions are not to be seen as limited by the foregoing description, but are only limited by the scope of the appended claims.

This written description uses examples to disclose the inventions, including the best mode, and also to enable any person skilled in the art to practice the inventions, including making and using any devices or systems and performing any incorporated methods. The patentable scope of the inventions are defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of cleaning a turbine engine, the method comprising:
    introducing a foamed, acid-including detergent with a pH range of between 2 and 7 into a gas flowpath of the turbine engine;
    positioning an aft distribution plug within an aft component of the turbine engine and positioning a forward distribution plug within a forward component of the turbine engine, wherein the aft distribution plug substantially seals an aft portion of the gas flowpath while within the aft component and the forward distribution plug substantially seals a forward portion of the gas flowpath while within the forward component, wherein at least one of the forward distribution plug or the aft distribution plug comprises a plurality of modular interconnecting segments that removably couple with each other;
    creating a pressure differential in the aft portion of the gas flowpath of the turbine engine with respect to the forward portion of the gas flowpath to generate a flow of the detergent therethrough, wherein the pressure differential is created in the aft portion of the gas flowpath via at least one port of the aft distribution plug that substantially seals the aft portion of the gas flowpath; and
    creating a pressure differential in the forward portion of the gas flowpath with respect to the aft portion of the gas flowpath to generate a counterflow of the detergent therethrough, wherein the pressure differential is created in the forward portion of the gas flowpath via at least one port of the forward distribution plug that substantially seals the forward portion of the gas flowpath,
    wherein the flow and counterflow of the detergent through the gas flowpath interact with components of the turbine engine having foreign material thereon to at least partially remove the foreign material from the components.

2. The method of claim 1, wherein the flow of the detergent and the counterflow of the detergent are formed sequentially.

3. The method of claim 1, wherein one of the flow and counterflow of the detergent through the gas flowpath extends in a direction that gases pass therethrough during operation of the turbine engine, and the other of the flow and counterflow of the detergent through the gas flowpath extends in a direction opposing a direction that gases pass therethrough during operation of the turbine engine.

4. The method of claim 1, wherein at least one of the components includes at least one cooling hole at least partially blocked by the foreign material, and wherein the flow and counterflow of the detergent through the gas flowpath removes the foreign material from at least partially blocking the at least one cooling hole.

5. The method of claim 1, wherein the detergent is introduced into the forward portion of the gas flowpath via the at least one port of the forward distribution plug.

6. The method of claim 1, wherein the detergent is introduced into the aft portion of the gas flowpath via the at least one port of the aft distribution plug.

7. The method of claim 1, wherein at least one of:
    creating a pressure differential in the aft portion of the gas flowpath of the turbine engine with respect to a forward portion of the gas flowpath comprises creating a vacuum in the aft portion of the gas flowpath with respect to a forward portion of the gas flowpath; and
    creating a pressure differential in the forward portion of the gas flowpath of the turbine engine with respect to an aft portion of the gas flowpath comprises creating a vacuum in the forward portion of the gas flowpath with respect to an aft portion of the gas flowpath.

8. The method of claim 1, wherein at least one of:
    creating a pressure differential in the aft portion of the gas flowpath of the turbine engine with respect to a forward portion of the gas flowpath comprises creating a pressure in the aft portion of the gas flowpath that is greater than the pressure within a forward portion of the gas flowpath; and
    creating a pressure differential in the forward portion of the gas flowpath of the turbine engine with respect to an aft portion of the gas flowpath comprises creating a pressure in the forward portion of the gas flowpath that is greater than the pressure within an aft portion of the gas flowpath.

9. The method of claim 1, wherein the aft distribution plug is located proximate an end of a low pressure turbine (LPT) section of the turbine engine and is configured to fit within the LPT section, and the forward distribution plug is located proximate a splitter and has an outer diameter that corresponds to an inner diameter of the splitter.

10. The method of claim 1, wherein the foreign material comprises at least one of calcium, magnesium, aluminum and silicon.

11. The method of claim 10, wherein at least one of components includes a thermal barrier coating (TBC), and wherein the foreign material overlies the TBC.

12. The method of claim 1, wherein the detergent at least partially dissolves the foreign material.

13. The method of claim 1, wherein the detergent is introduced into the gas flowpath of the turbine engine at a temperature within the range of 20 degrees C. to about 95 degrees C.

14. The method of claim 1, wherein the pressure differentials in the aft and forward portions of the gas flowpath of the turbine engine are varied over time to control the flow the detergent therethrough.

15. The method of claim 1, wherein the forward distribution plug is coupled to a plurality of forward distribution ports circumferentially distributed about the engine, and the aft distribution plug is coupled to a plurality of aft distribution ports circumferentially distributed about the engine.

* * * * *